US012080965B2

(12) United States Patent
Little

(10) Patent No.: US 12,080,965 B2
(45) Date of Patent: Sep. 3, 2024

(54) LOW PROFILE ELECTRICAL CABLE CONNECTOR

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventor: Terrance F. Little, Fullerton, CA (US)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 382 days.

(21) Appl. No.: 17/672,953

(22) Filed: Feb. 16, 2022

(65) Prior Publication Data

US 2022/0271454 A1 Aug. 25, 2022

Related U.S. Application Data

(60) Provisional application No. 63/153,107, filed on Feb. 24, 2021.

(51) Int. Cl.

*H01R 12/71* (2011.01)
*H01R 13/40* (2006.01)
(Continued)

(52) U.S. Cl.

CPC ........... *H01R 12/716* (2013.01); *H01R 13/40* (2013.01); *H01R 13/502* (2013.01);
(Continued)

(58) Field of Classification Search

CPC .... H01R 12/716; H01R 13/40; H01R 13/502; H01R 13/516; H01R 13/629; H01R 13/639; H01R 12/79; H01R 4/023; H01R 12/775; H01R 13/6471; H01R 13/65914; H01R 13/65918; H01R 13/6593; H01R 13/405; H01R 13/02; H01R 13/521

See application file for complete search history.

(56) References Cited

U.S. PATENT DOCUMENTS 9,124,009 B2 9/2015 Prescott et al.
9,985,358 B2 * 5/2018 Zhu ...................... H01R 12/778
(Continued)

*Primary Examiner* — Briggitte R. Hammond
(74) *Attorney, Agent, or Firm* — Ming Chieh Chang

(57) ABSTRACT

A cable connector includes a base and a mating portion extending downwardly from a lower side of the base, and an upper and a lower platform around an upper side of the base. First and second rows of contacts include connecting sections. The connecting sections of the first row are exposed upon the lower platform and the connecting sections of the second row are exposed upon the upper platform. Upper and lower rows of wires are located above the housing. Two grounding brackets are mounted upon the upper and lower platforms. Each bracket includes bulged sections and tails. Inner conductors of the wires are connected to the connecting sections of the differential-pair contacts, the braiding layers of the wires are sandwiched between the bulged sections and the housing in the vertical direction, and the tails are connected to the connecting sections of the grounding contacts.

18 Claims, 29 Drawing Sheets

(51) Int. Cl.

| | |
|---|---|
| ***H01R 13/502*** | (2006.01) |
| ***H01R 13/516*** | (2006.01) |
| ***H01R 13/629*** | (2006.01) |
| ***H01R 13/639*** | (2006.01) |

(52) U.S. Cl.
CPC ......... *H01R 13/516* (2013.01); *H01R 13/629* (2013.01); *H01R 13/639* (2013.01)

(56) References Cited

U.S. PATENT DOCUMENTS

| | | | | |
|---|---|---|---|---|
| 10,135,197 | B2 * | 11/2018 | Little ..................... | H01R 12/58 |
| 10,381,767 | B1 | 8/2019 | Milbrand, Jr. et al. | |
| 2020/0366017 | A1 | 11/2020 | Blackburn et al. | |
| 2021/0351536 | A1 | 11/2021 | Chung et al. | |
| 2022/0029360 | A1 | 1/2022 | Little et al. | |

* cited by examiner

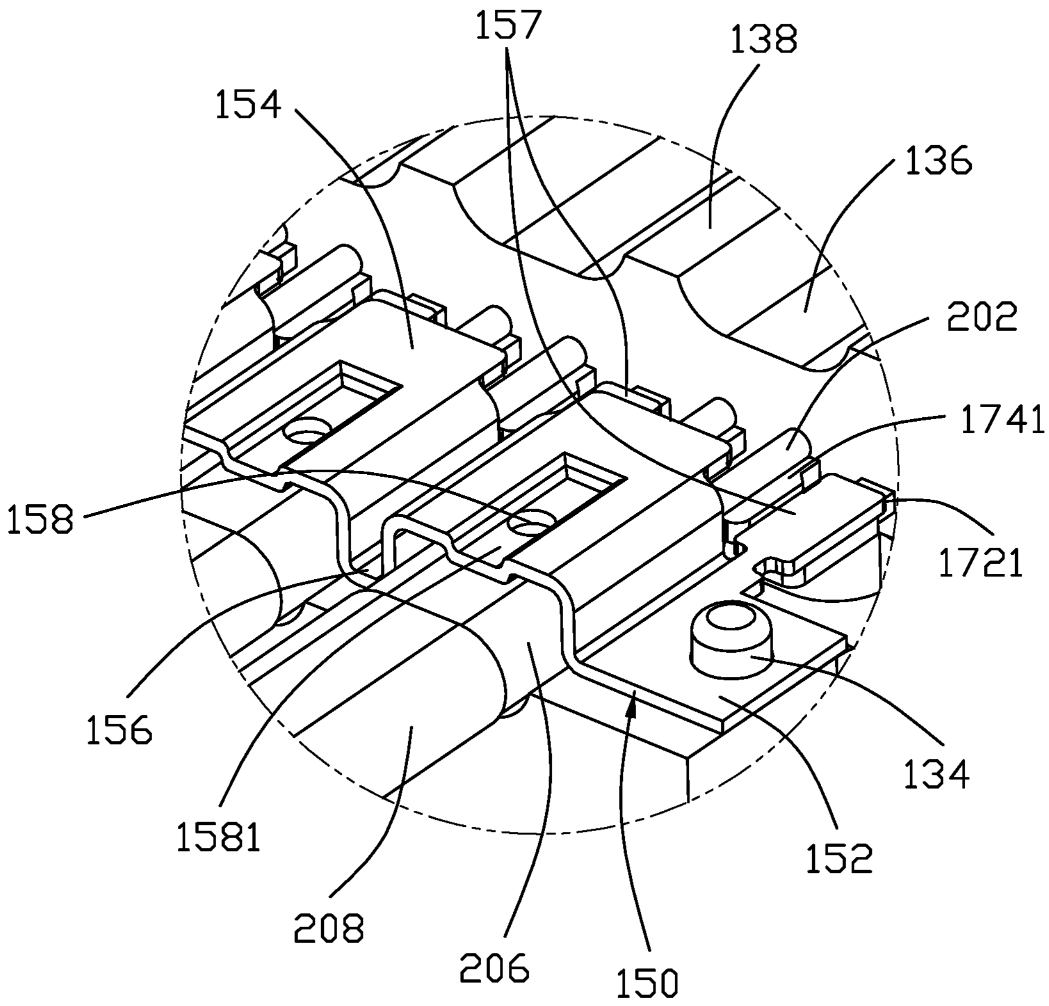
FIG. 9(B-1)

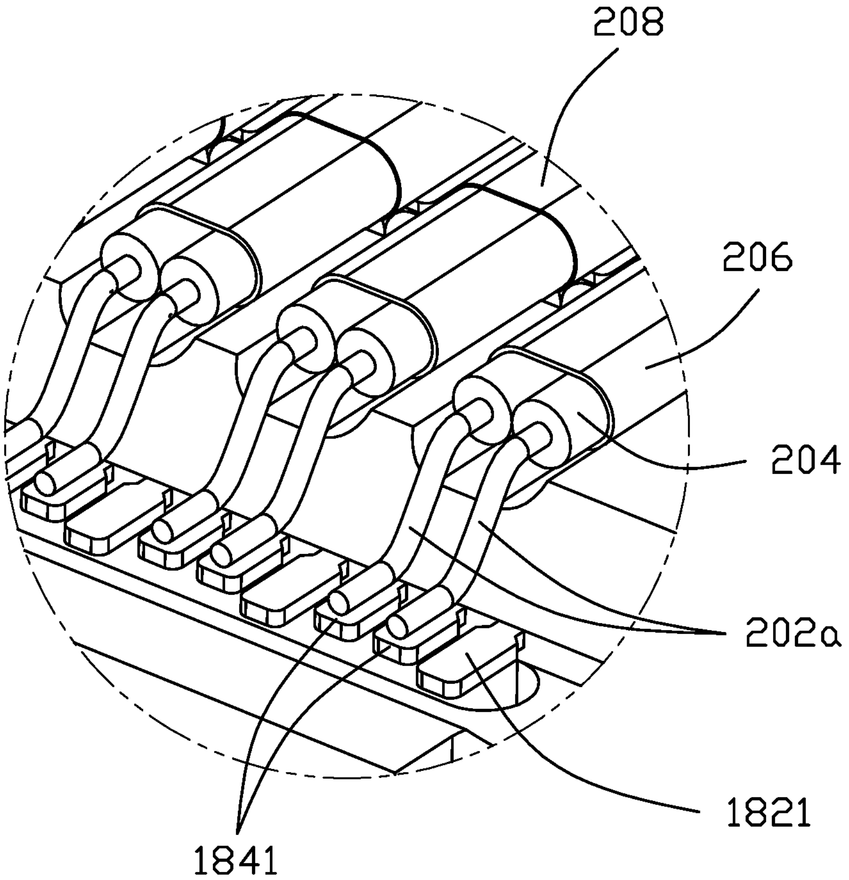
FIG. 9(C-1)

LOW PROFILE ELECTRICAL CABLE CONNECTOR

CROSS REFERENCE TO RELATED APPLICATION

This application claims the benefit of, and priority to, U.S. Provisional Patent Application No. 63/153,107, filed Feb. 24, 2021, the contents of which is incorporated entirely herein by reference.

BACKGROUND OF THE INVENTION

1. Field of the Invention

The present invention relates generally to an electrical plug/cable connector for use with an upstanding type receptacle connector, and particularly to a low profile plug/cable connector for use with such upstanding type receptacle connector.

2. Description of Related Art

U.S. Pat. No. 10,381,767 discloses an electrical connector assembly including a corrugated plate that is shaped to make contact with tails of ground contacts thereof. The corrugated plate provides shielding in the vicinity of tails of signal contacts for radiation emanating from or incident on signal wires of cables from an upper direction and a similar corrugated plate may be attached from below, effectively providing shielding on both sides of the signal wires and the signal contact tails. U.S. Patent Application Publication No. 2020/0366017 discloses a cable assembly including a cable module having a ground shield, wherein the ground shield has a ground plate held in a housing thereof and plural ground blades located between adjacent cable wires. The ground blades are configured to be electrically connected to the ground plate that extends over the tops of the cable wires.

SUMMARY OF THE INVENTION

A cable connector comprises: an insulative housing comprising a base with opposite upper and lower sides in a vertical direction, a mating portion extending downwardly from the lower side, and an upper platform and a lower platform formed around the upper side and each extending along a longitudinal direction which is perpendicular to the vertical direction, the upper platform and the lower platform spaced from each other in both the vertical direction and a transverse direction which is perpendicular to the vertical direction and the longitudinal direction; first and second rows of contacts disposed in the insulative housing and each row arranged along the longitudinal direction with corresponding contacting sections exposed upon the mating portion and corresponding connecting sections, the connecting sections of the first row being exposed upon the lower platform at a same level in the vertical direction, and the connecting sections of the second row being exposed upon the upper platform at a same level in the vertical direction, each row of contacts comprising a plurality of differential-pair contacts and grounding contacts alternately arranged with each other in the longitudinal direction; upper and lower rows of wires located above the insulative housing in the vertical direction, each wire comprising an inner conductor, an inner insulator, a metallic braiding layer and an outer insulator sequentially arranged with one another; and a metallic upper grounding bracket and a metallic lower grounding bracket located at different levels in the vertical direction and respectively mounted upon the upper platform and the lower platform, each of the upper grounding bracket and the lower grounding bracket including a plurality of bulged sections and a plurality of tails alternately arranged with each other in the longitudinal direction, wherein the inner conductors of the wires are mechanically and electrically connected to the connecting sections of the differential-pair contacts, the braiding layers of the wires are sandwiched between the bulged sections and the insulative housing in the vertical direction, and the tails are mechanically and electrically connected to the connecting sections of the grounding contacts.

BRIEF DESCRIPTION OF THE DRAWING

FIG. 9(B-1) is an enlarged perspective view of a portion of the contact module of the contact module assembly of the cable connector of FIG. 9(B) in circle;

FIG. 9(C-1) is an enlarged perspective view of a portion of the contact module of the contact module assembly of the cable connector of FIG. 9(C);

DETAILED DESCRIPTION OF THE PREFERRED EMBODIMENT

Figure 1A:
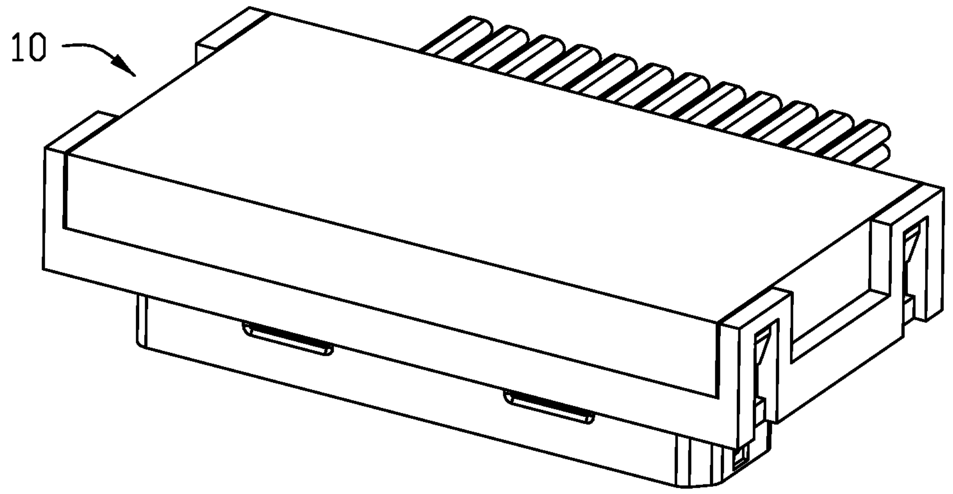
FIG. 1(A) is a perspective view of an electrical cable connector adapted to be mated with an upstanding receptacle connector according to this invention.
Figure 1B:
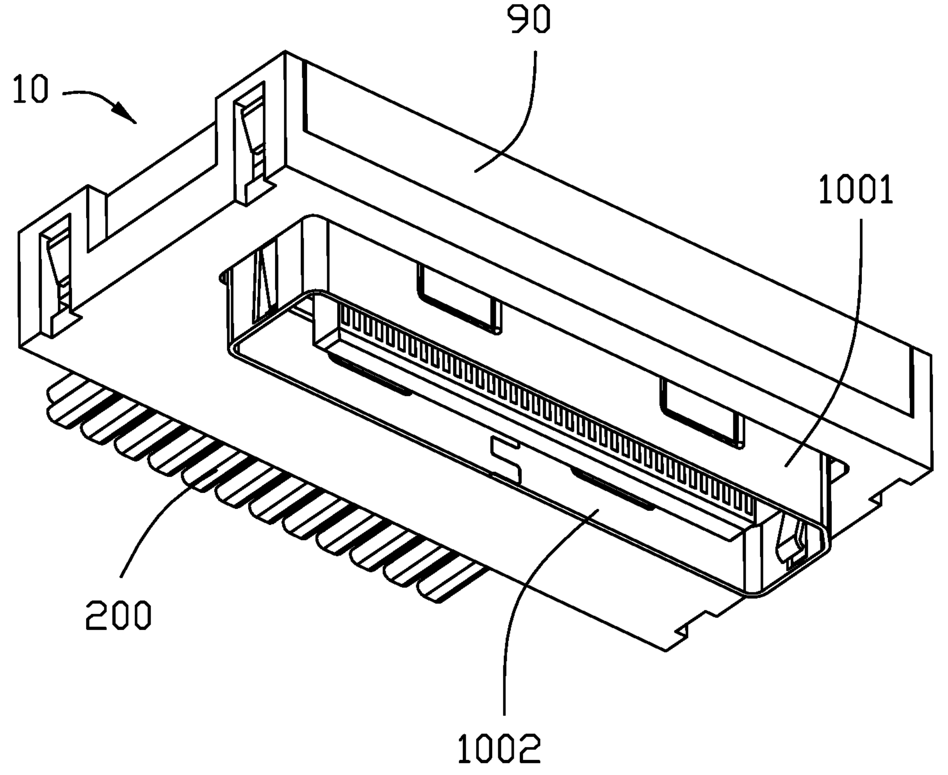
FIG. 1(B) is another perspective view of the electrical cable connector of FIG. 1 (A)
Figure 1C:
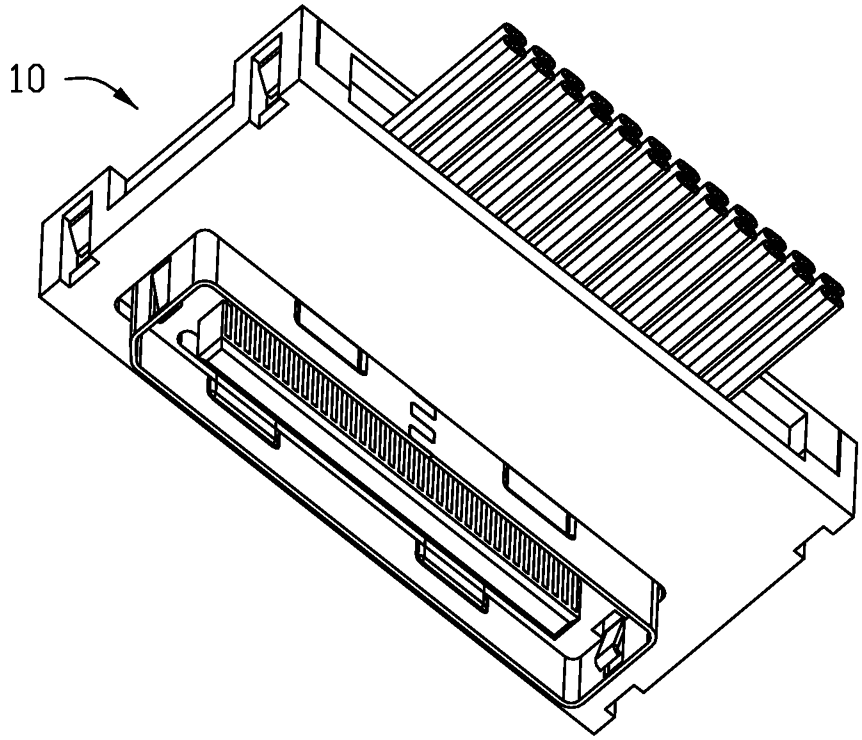
FIG. 1(C) is another perspective view of the electrical cable connector of FIG. 1 (A)
Figure 2:
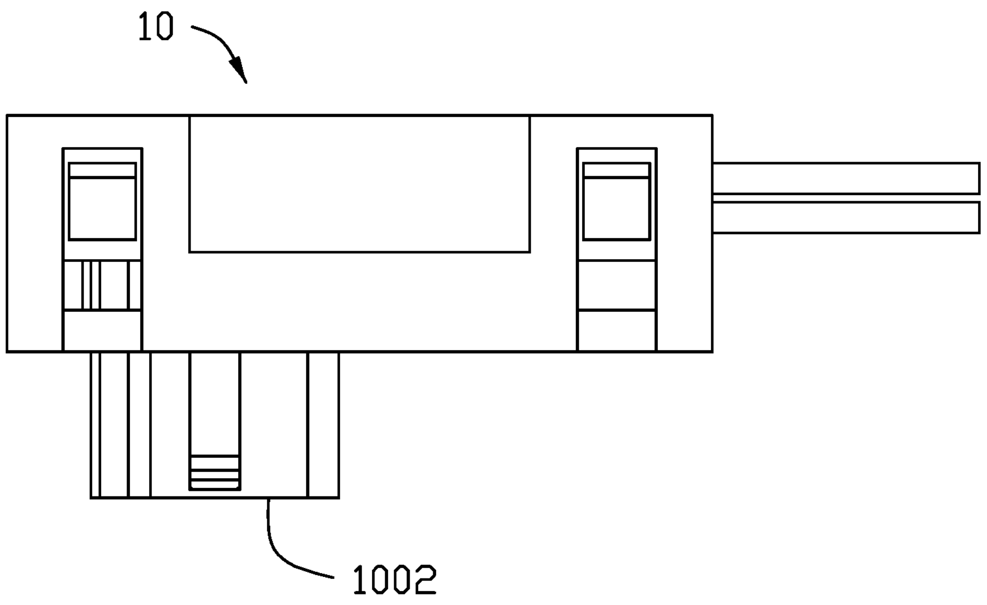
FIG. 2 is a side view of the electrical connector of FIG. 1(A)
Figure 3:
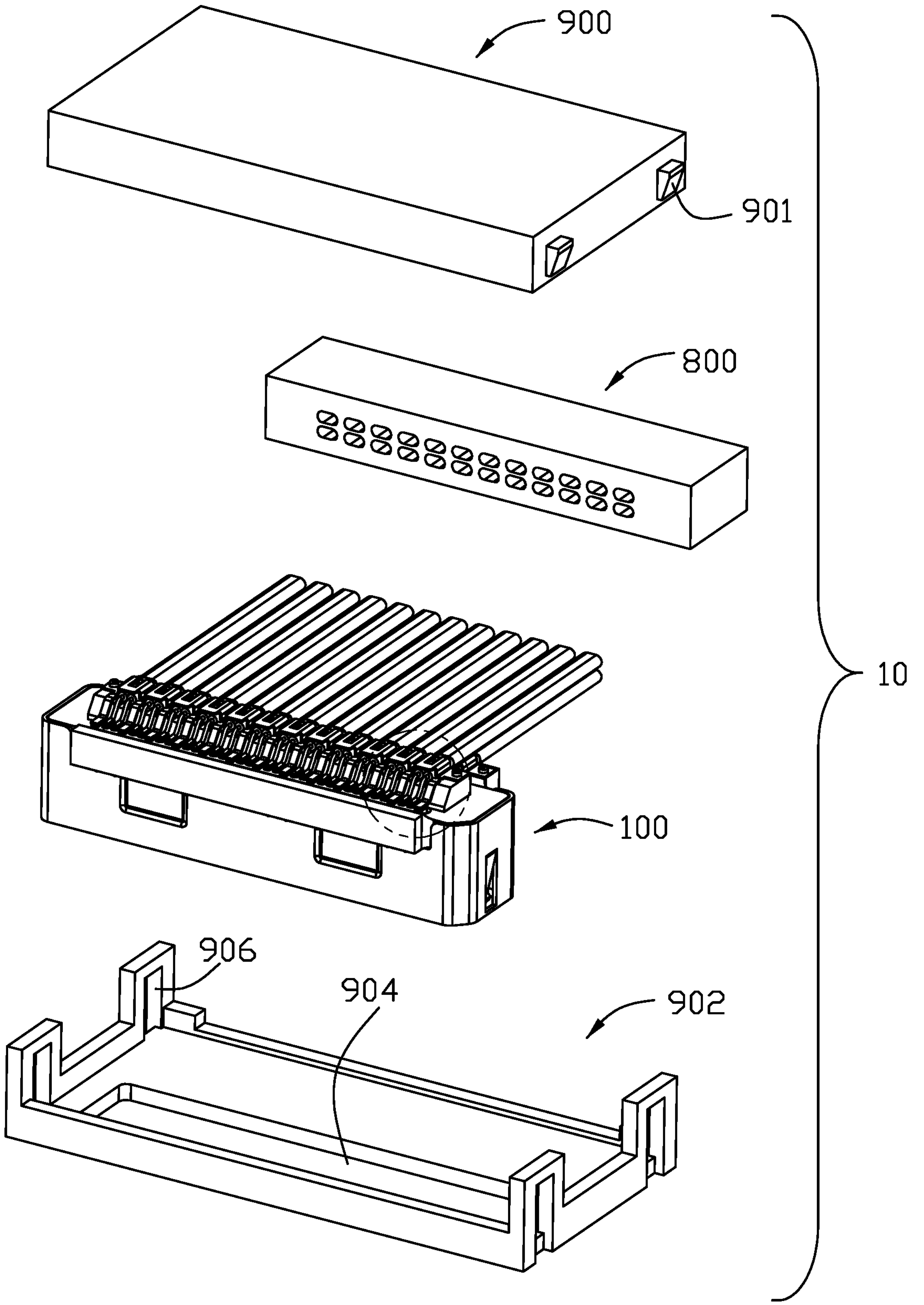
FIG. 3 is an exploded perspective view of the electrical cable connector of FIG. (A)
Figure 3A:
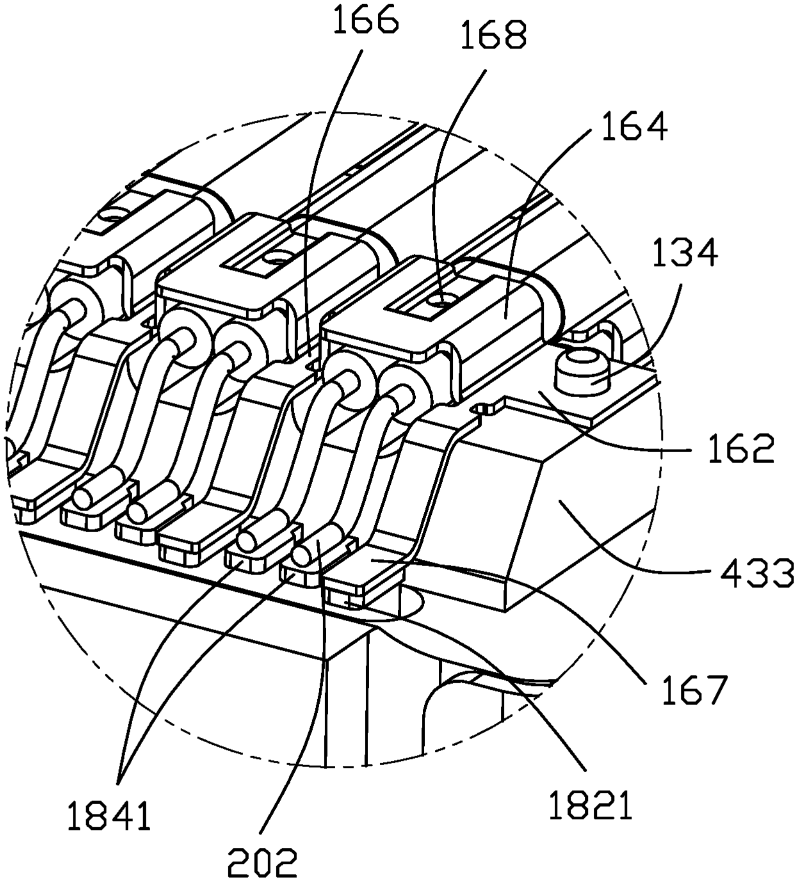
FIG. 3(A) is an enlarged perspective view of a portion of the electrical cable connector of FIG. 3 in circle.
Figure 4A:
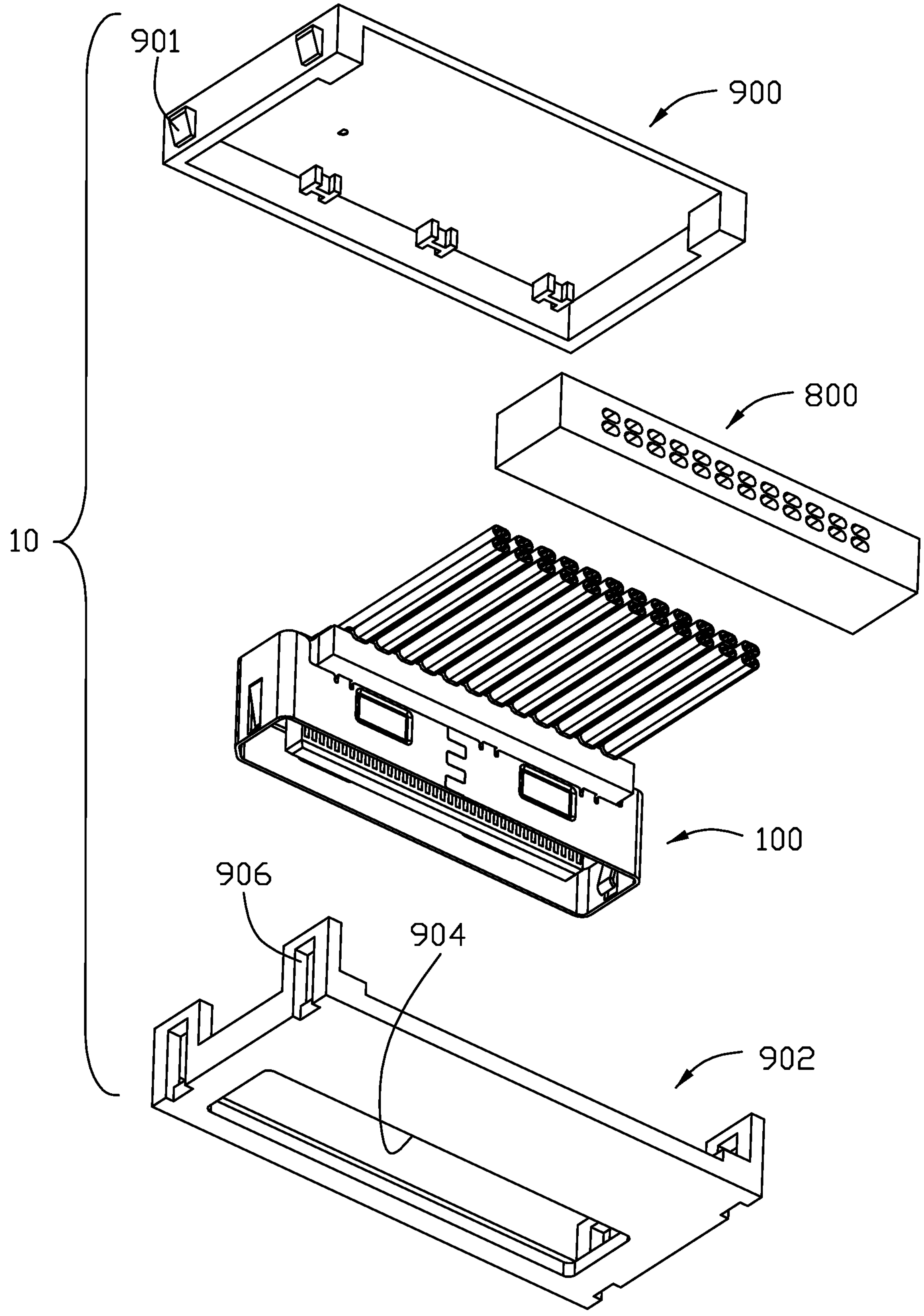
FIG. 4(A) is another exploded perspective view of the electrical cable connector of FIG. 3(A)
Figure 4B:
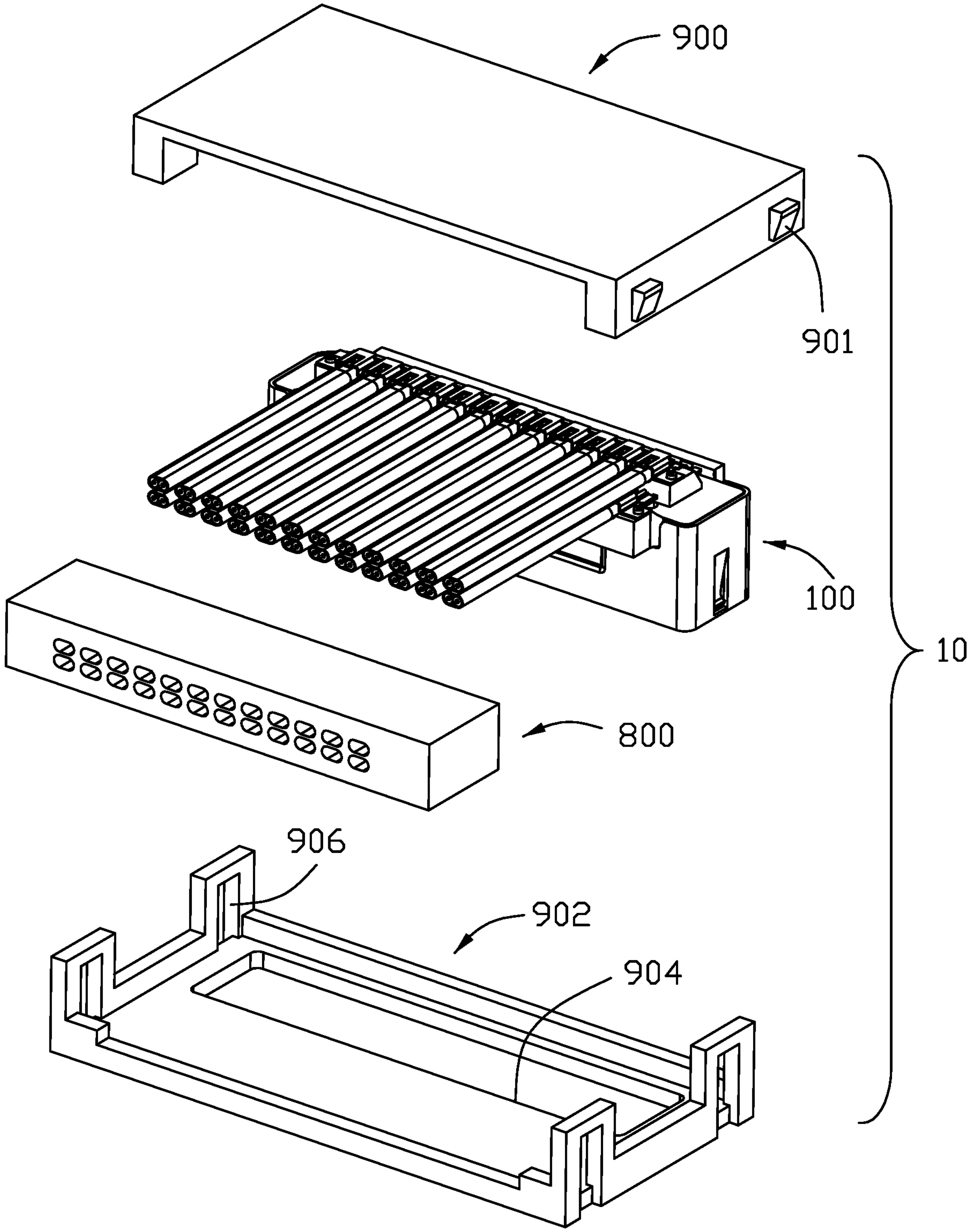
FIG. 4(B) is another exploded perspective view of the electrical cable connector of FIG. 3(A)
Figure 5:
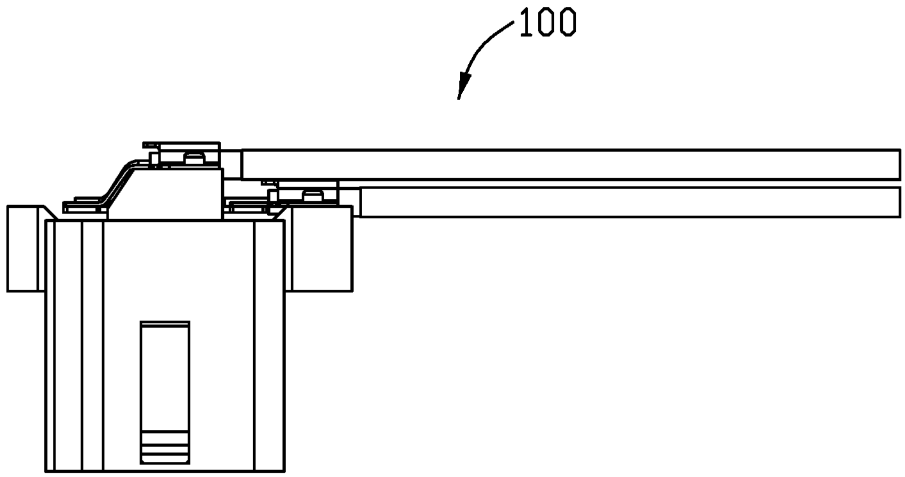
FIG. 5 is a side view of contact module assembly of the electrical cable connector of FIG. 4(A)

Reference will now be made to the drawing figures to describe the preferred embodiment of the present invention in detail.

Referring to FIGS. 1-13(B), a cable connector 10 adapted to be mated with an upstanding receptacle connector (not shown) includes a contact module assembly 100 retained within a case 90 rearwardly sealed by an inner mold 800 which is applied upon the contact module assembly 100, and wires 200. The contact module assembly 100 defines a mating portion 1001 which is used to inserted into the receptacle connector, with a downward face 1002 and a mating opening 1003 through the downward face 1002. The case 90 includes an upper case 900 and a lower case 902 assembled to each other by the protrusions 901 on the upper case 900 received and locked within the corresponding holes 906 in the lower case 902. The lower case 902 further forms a downward opening 904, through which the contact module assembly 100 to form said mating port 1001.

Figure 6A:
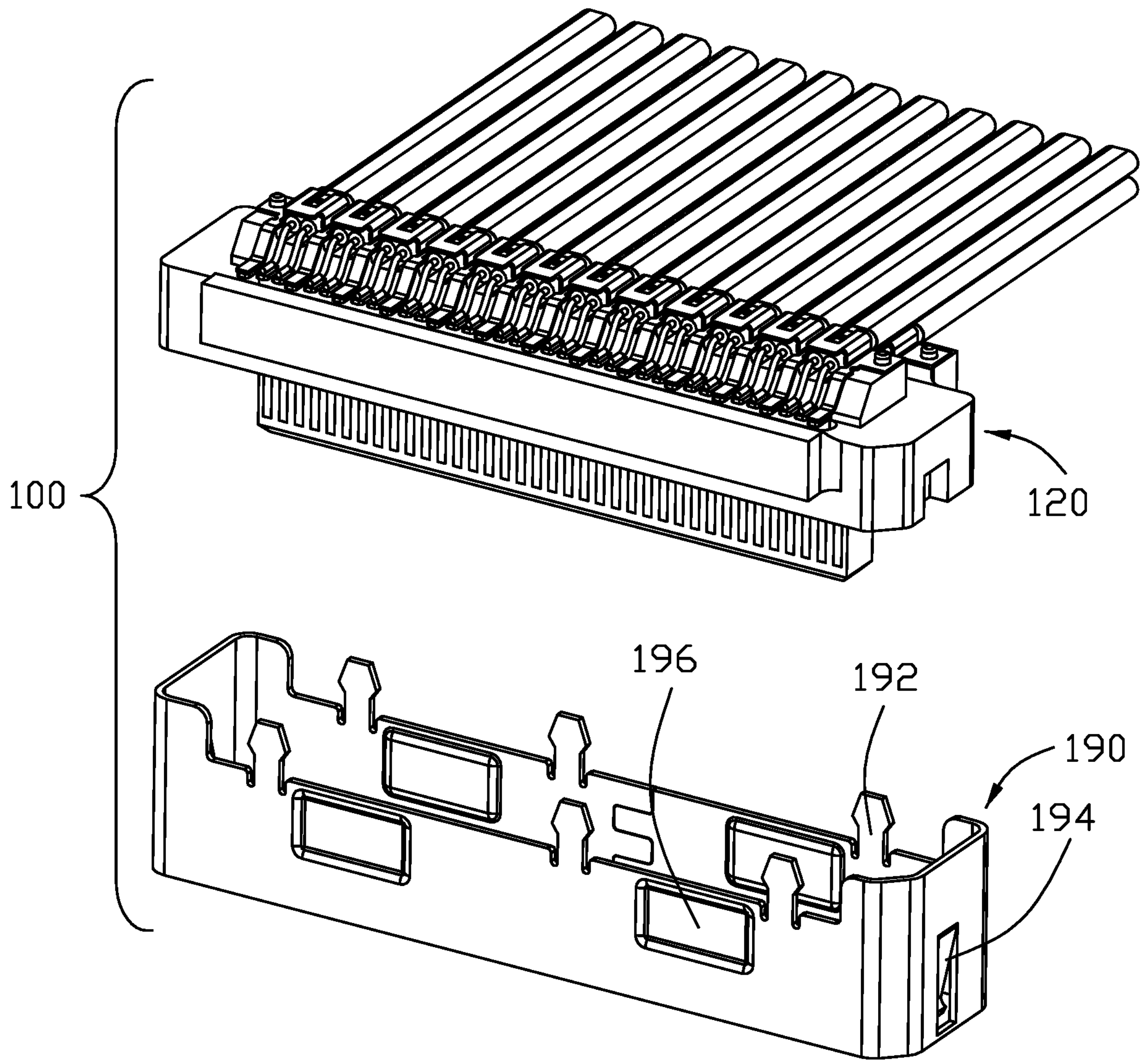
FIG. 6(A) is an exploded perspective view of the contact module assembly of the electrical cable connector of FIG. 5.
Figure 6B:
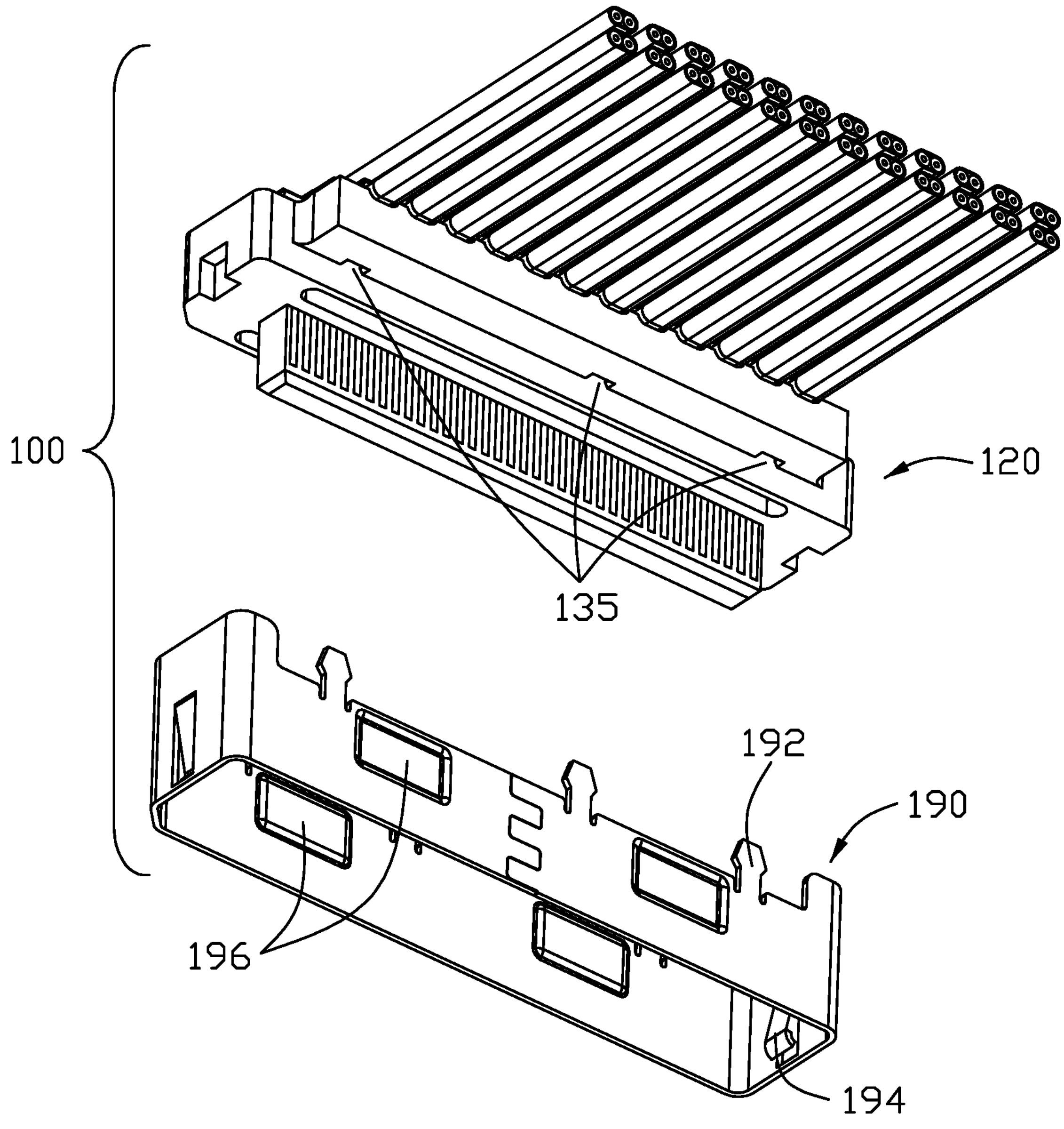
FIG. 6(B) is another exploded perspective view of the contact module assembly of the electrical cable connector of FIG. 6(A)
Figure 6C:
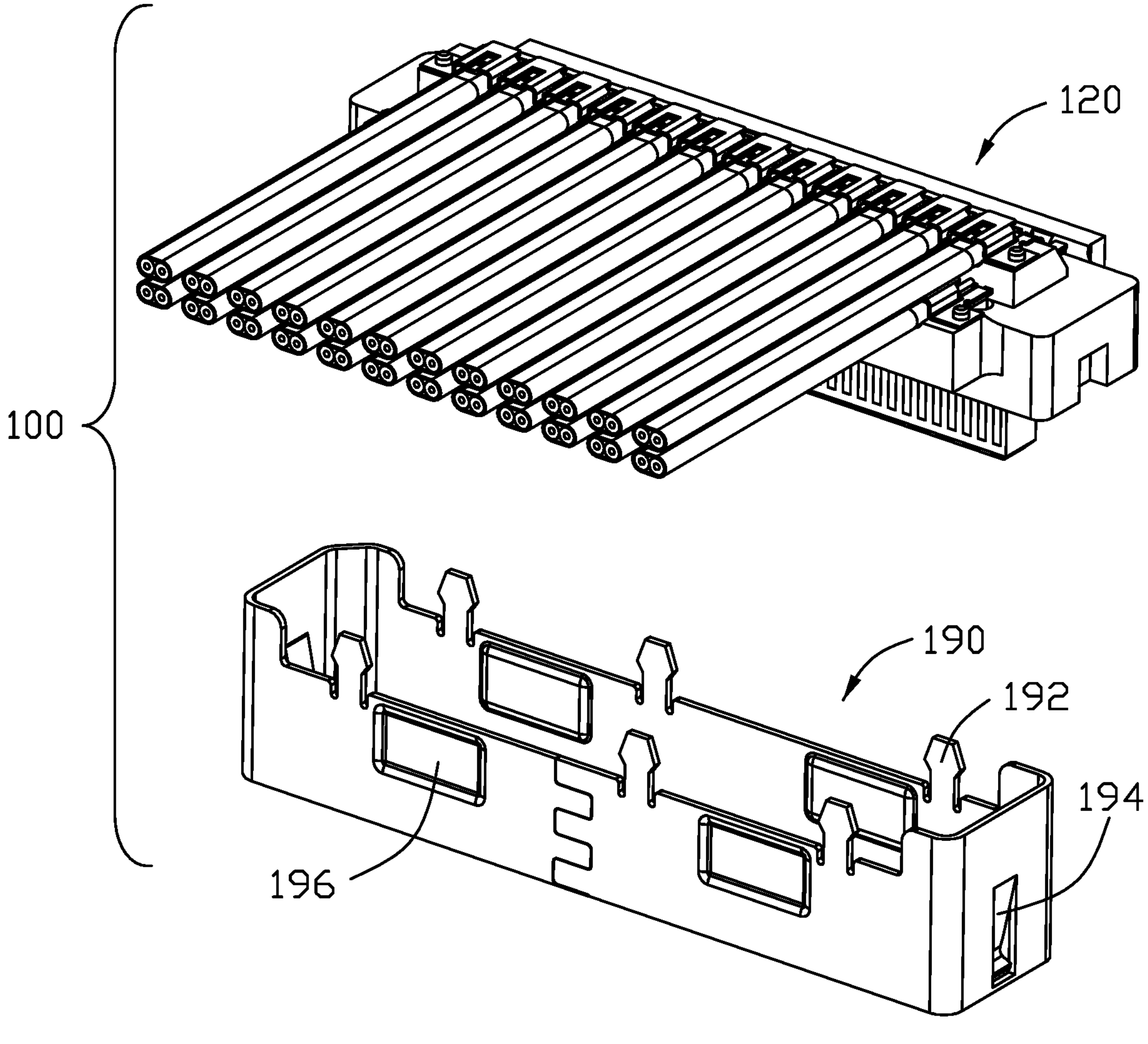
FIG. 6(C) is another exploded perspective view of the contact module assembly of the cable connector of the electrical cable connector of FIG. 6(A)
Figure 7A:
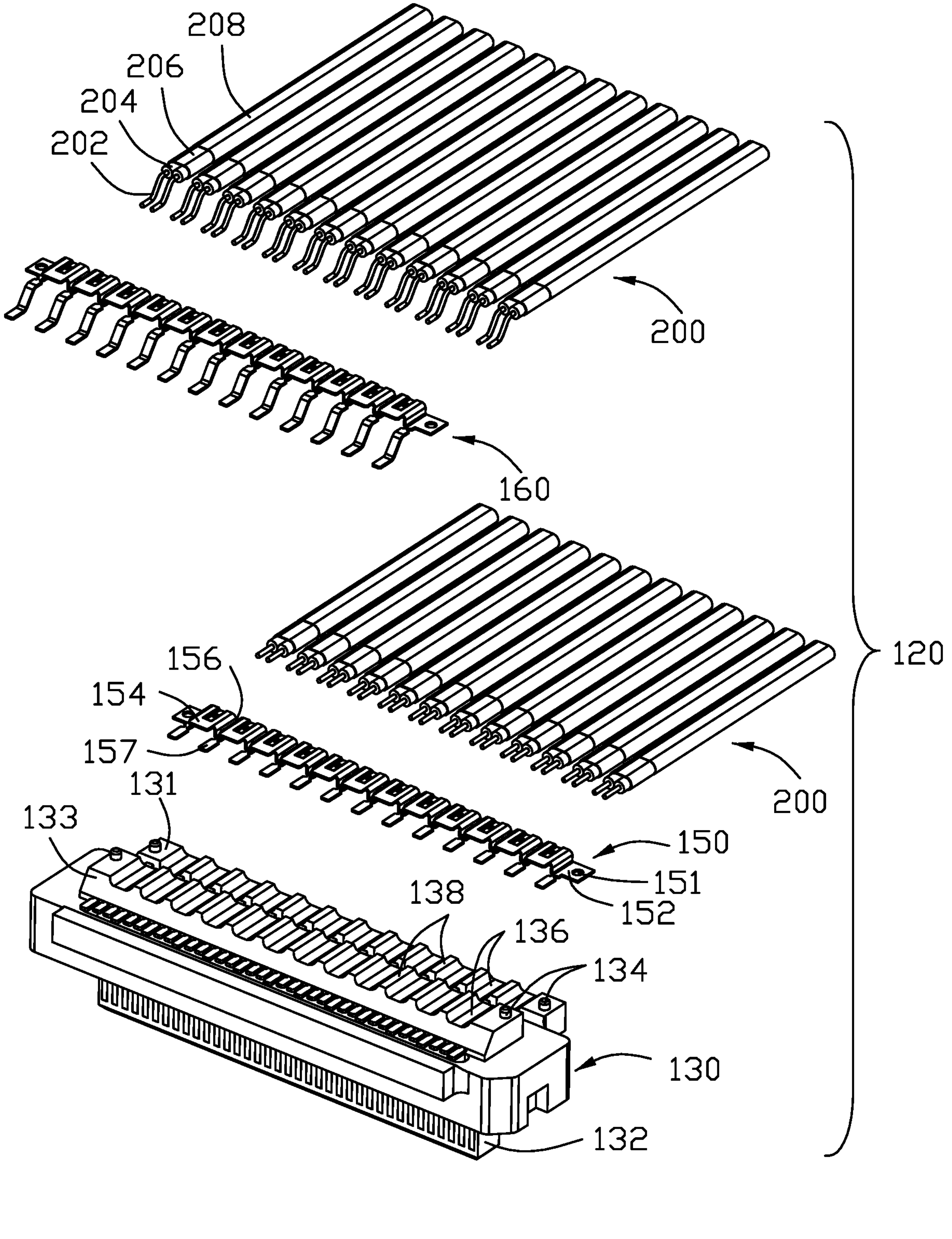
FIG. 7(A) is an exploded perspective view of the contact module of the contact module assembly of the electrical cable connector of FIG. 6(A)
Figure 7B:
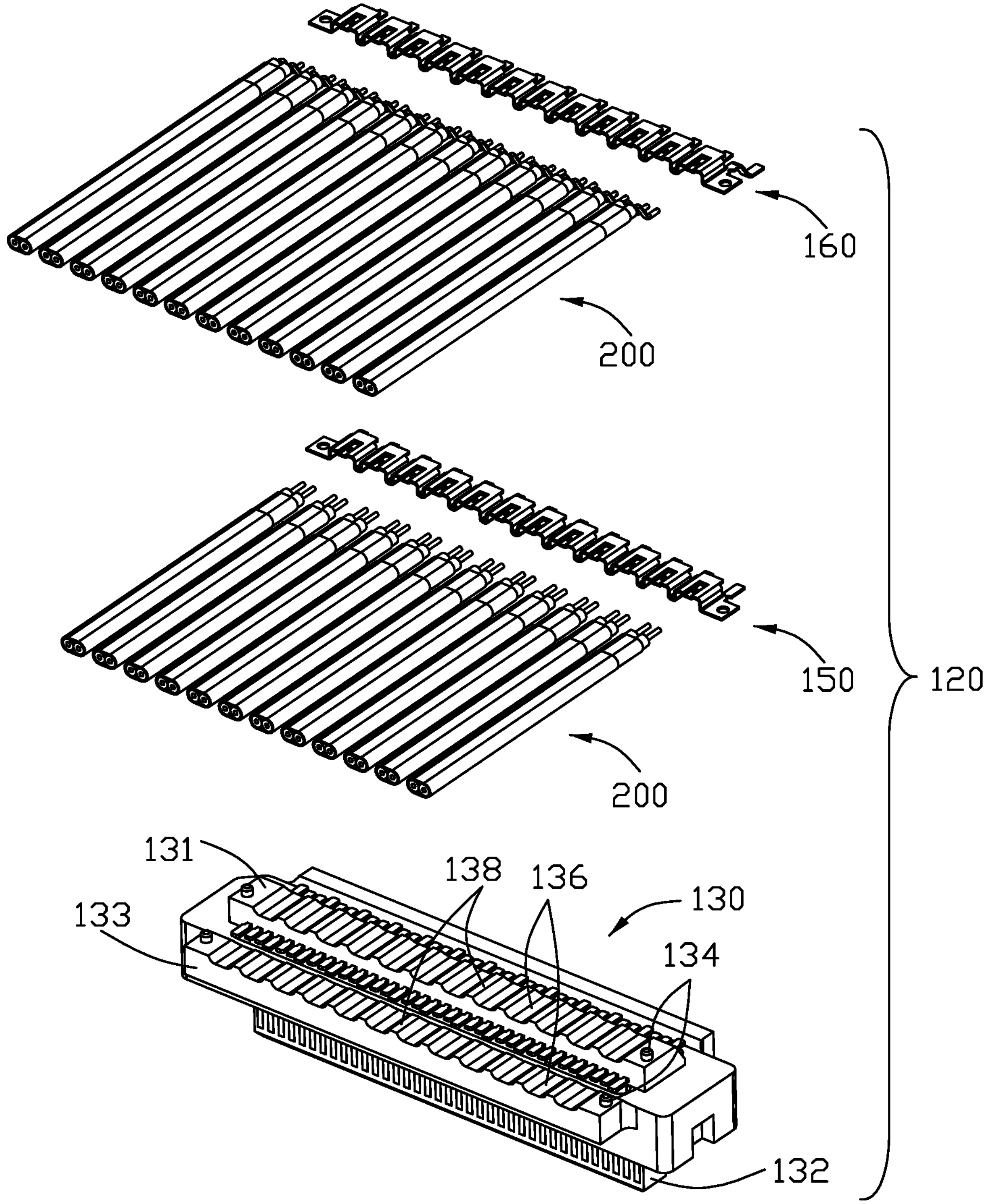
FIG. 7(B) is another exploded perspective view of the contact module of the contact module assembly of the cable connector of the electrical connector assembly of FIG. 7(A)

The contact module assembly 100 includes an insulative housing 130 with two rows of contacts integrally formed therewithin by insert-molding to form a contact module wherein each row extends in a longitudinal direction. The housing 130 includes a base 130*a* (as best shown in FIG. 6) defining a downward side and an upper side opposite to each other in a vertical direction perpendicular to the longitudinal direction. A mating tongue 132 extends downwardly from the downward side of the base 130*a* in the vertical direction, and a connecting port (not labeled) is upwardly formed on the upward side and is essentially composed of a lower platform 131 and an upper platform 133. The contacts 170 are arranged in a first/inner row and the contacts 180 are arranged in the second/outer row. Each row of contacts are categorized with a plurality of differential-pair contacts 170S, 180S and a plurality of grounding contacts 170S, 170G alternately arranged with each other along the longitudinal direction. In the first row of contacts 170, each differential-pair contact/grounding contact includes a contacting section 1742/1722 exposed upon the mating tongue 132, a connecting section 1741/1721 exposed upon the lower platform 131, and a retaining section (not labeled) therebetween with barbs thereon for embedment within the base 130*a*.

Similarly, in the second row of contacts 180, each differential-pair contact/grounding contact includes a contacting section 1842/1822 exposed upon the mating tongue 132, a connecting section 1841/1821 exposed upon the upper platform 133, and a retaining section (not labeled) therebetween with barbs thereon for embedment within the base. The connecting sections 1721/1741 of the contacts 170 in first row are essentially located at a same level with the connecting sections 1821/1841 of the contacts 180 in the second row, and extend away from each other in a transverse direction perpendicular to both the longitudinal direction and the vertical direction. Each of the upper platform 133 and the lower platform 131 includes a plurality of ribs 138 and a plurality of recesses 136 alternatively arranged with each other along the longitudinal direction. Two positioning posts 134 are formed on two opposite ends of the upper platform 133 and the lower platform 131. The connecting sections of the first row and the second row of contacts are located at a same level in the upright direction. The connecting sections of the first row of contacts 170 bend toward the lower platform in the transverse direction and located between the lower platform and the upper platform in the transverse direction. The connecting sections of the second row of contacts bend away from the upper platform in the transverse direction. The upper platform 133 is located between the connecting sections of the first row and the second row of contacts.

Upper and lower rows of horizontal wires 200 extending along the same transverse direction, are respectively mounted upon the upper platform 133 and the lower platform 131 to respectively mechanically and electrically connect to the connecting sections of the corresponding contacts. Each wire 200 includes an inner conductor 202, an inner insulator 204, the metallic braiding layer 206 and the outer insulative jacket 208 sequentially arranged with one another wherein the inner conductor 202 is mechanically and electrically connected to the connecting section 1741, 1841 of the differential-pair contacts in the contacts 170, 180. The braiding layers 206 are received in the recess 136 and the inner conductors 2020 are directly disposed on the connecting sections of the of the differential-pair contacts.

A metallic lower/first grounding bracket 150 and a metallic upper/second grounding bracket 160 both extending along the longitudinal direction, are respectively secured to the lower platform 131 and the upper platform 133 to respectively hold the corresponding lower row and upper rows of horizontal wires 200.

Figure 8:
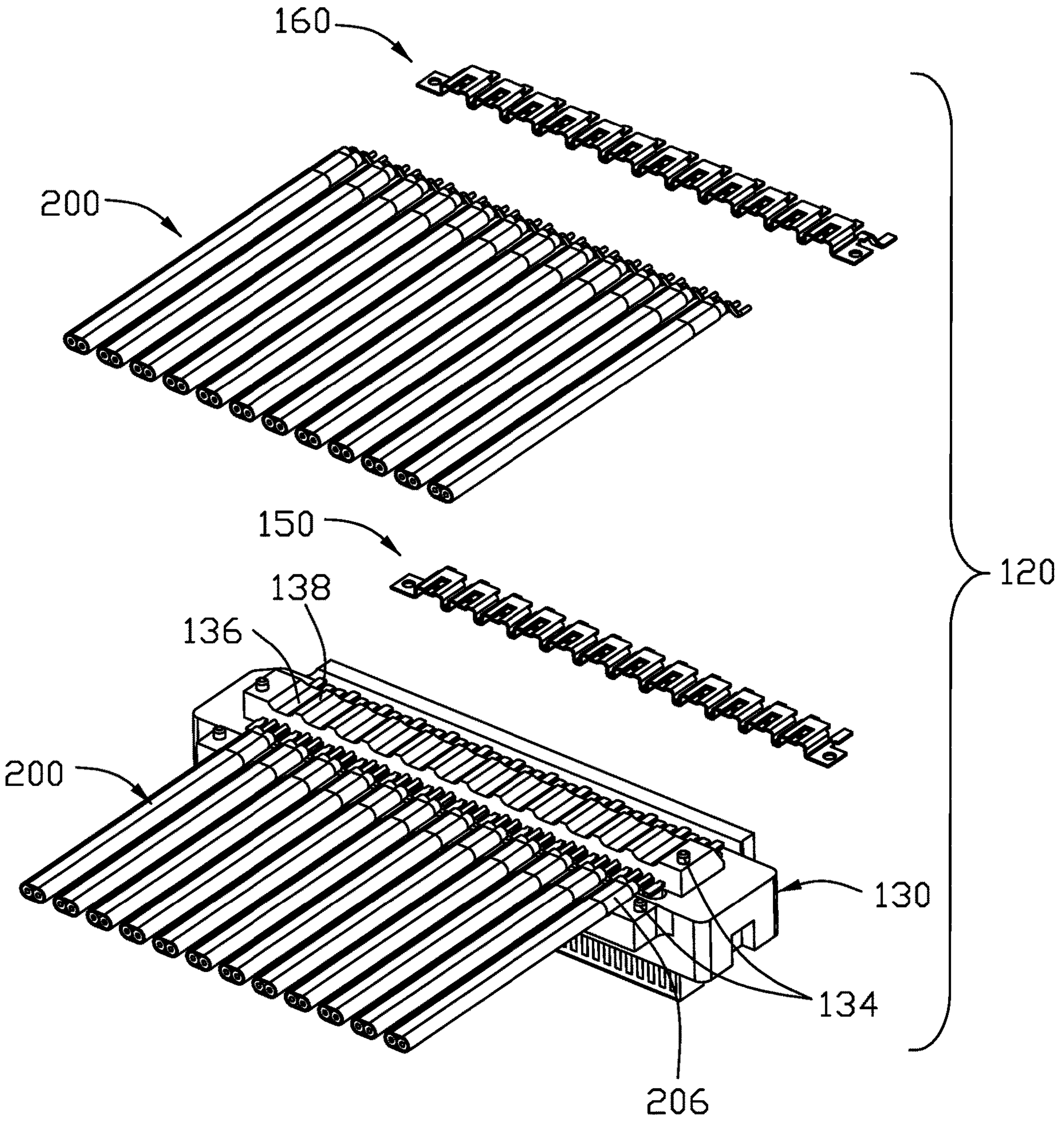
FIG. 8 is an exploded perspective view of the contact module of the contact module assembly of the cable connector of FIG. 7(A) wherein the lower row of wires are assembled upon the lower platform.
Figure 9A:
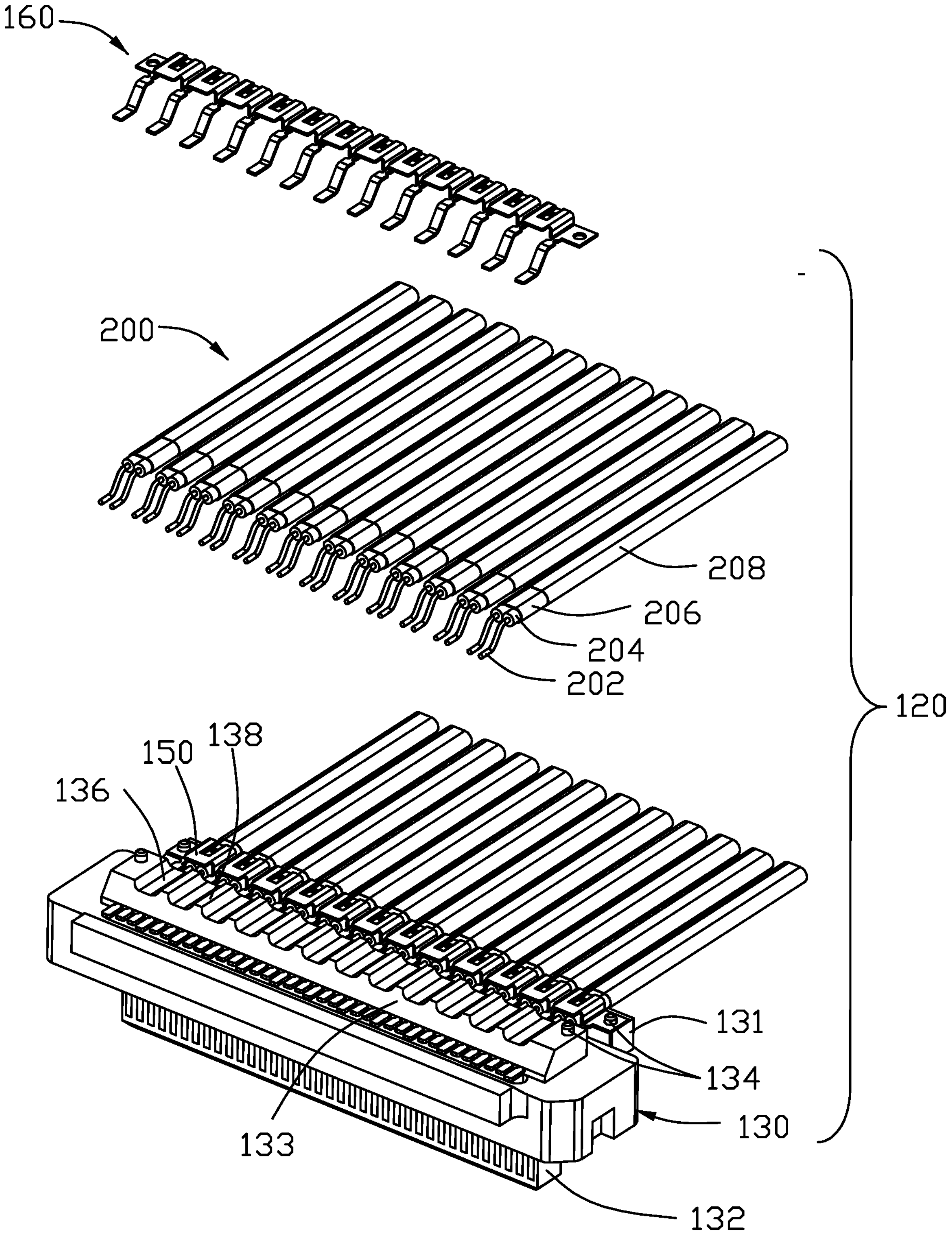
FIG. 9(A) is an exploded perspective view of the contact module of the contact module assembly of the cable connector of FIG. 8 wherein the lower grounding bracket is assembled upon the lower platform.
Figure 9B:
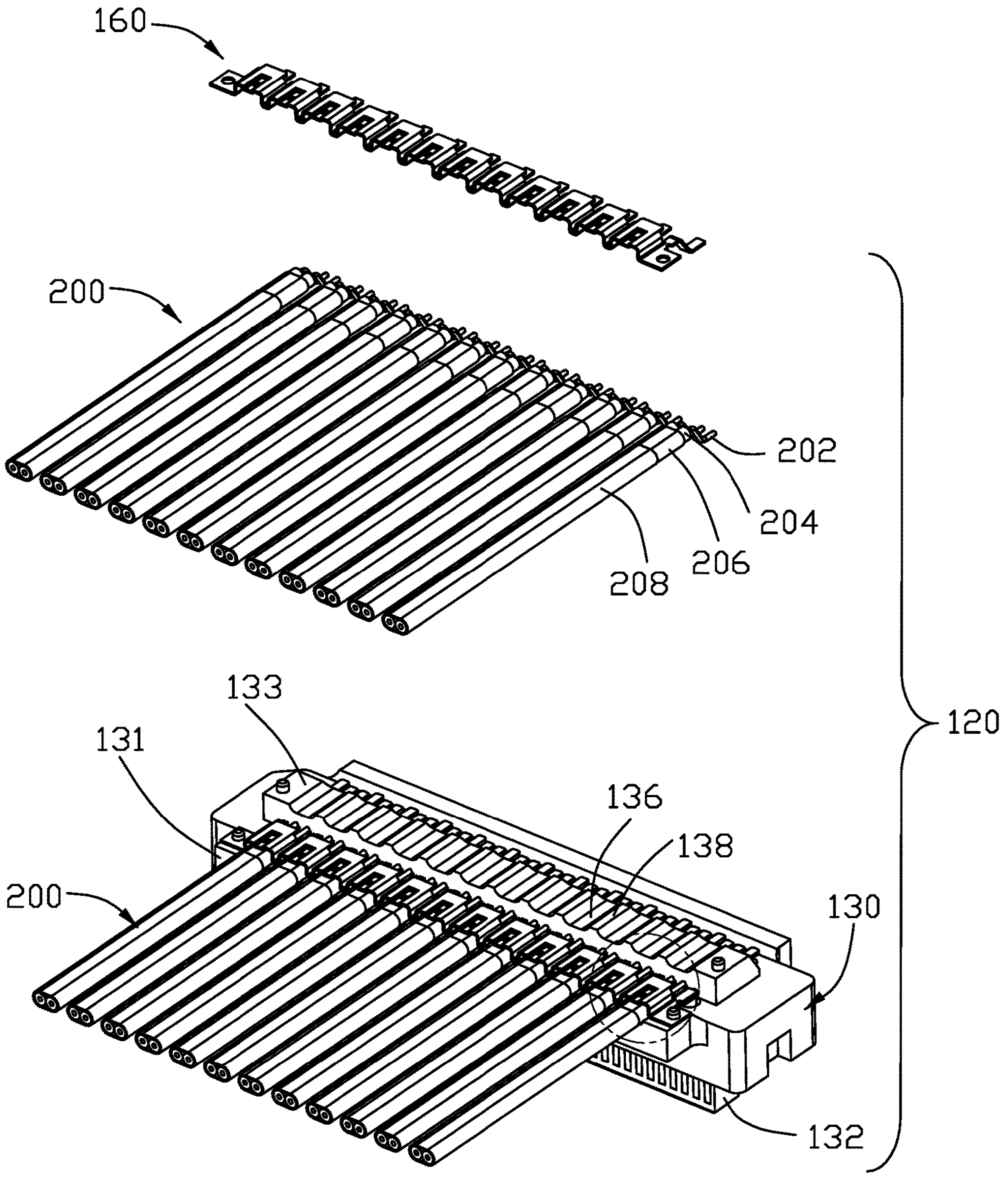
FIG. 9(B) is another exploded perspective view of the contact module of the contact module assembly of the cable connector of FIG. 9(A)
Figure 9C:
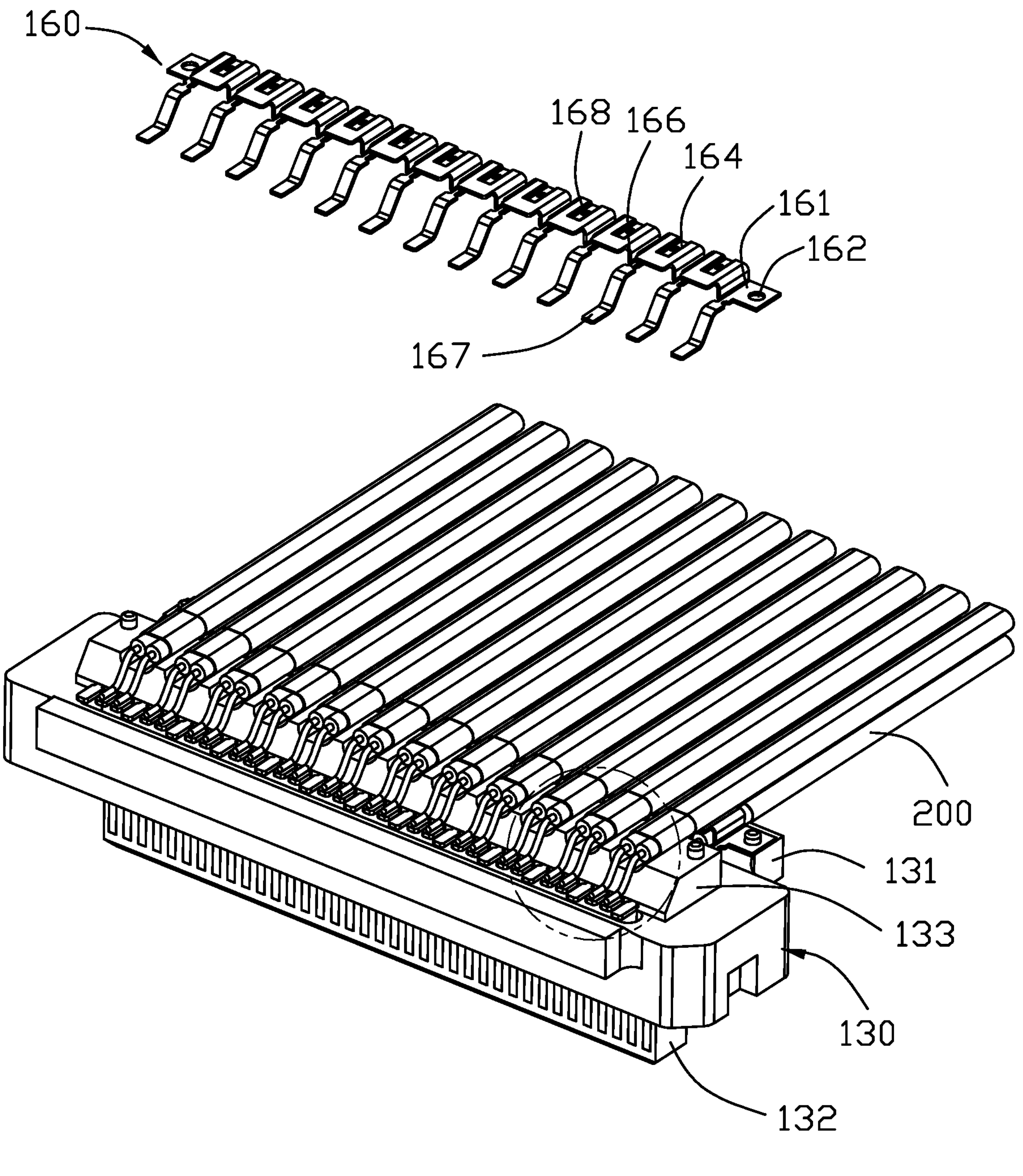
FIG. 9(C) is an exploded perspective view of the contact module of the contact module assembly of the cable connector of FIG. 9(A) wherein the upper row of wires are assembled upon the upper platform in circle.
Figure 10A:
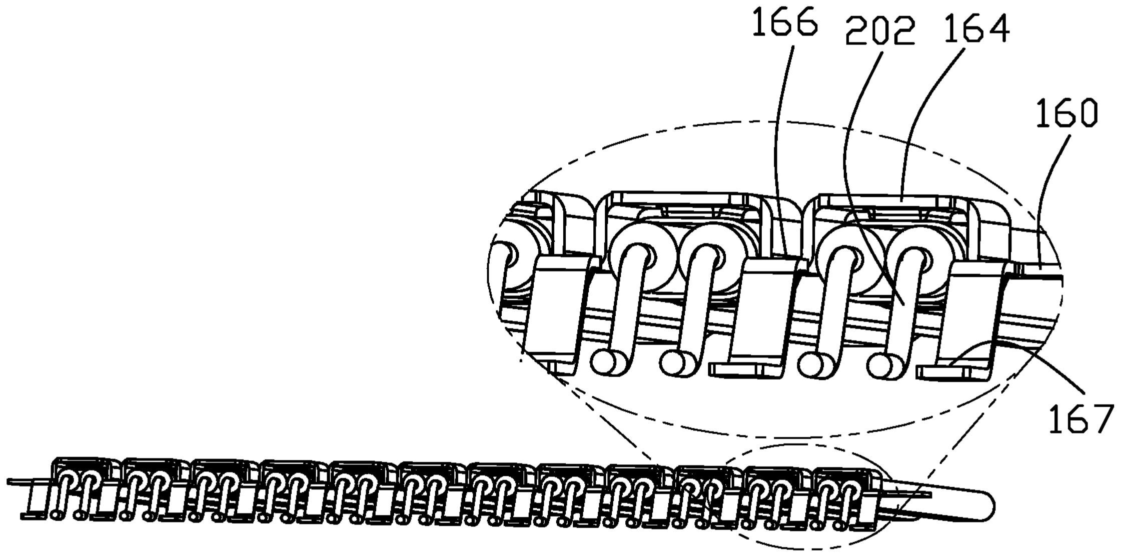
FIG. 10(A) is a perspective view of a combination of the upper grounding bracket and the upper row of wires of the contact module of the contact module assembly of the cable connector of FIG. 8.
Figure 10B:
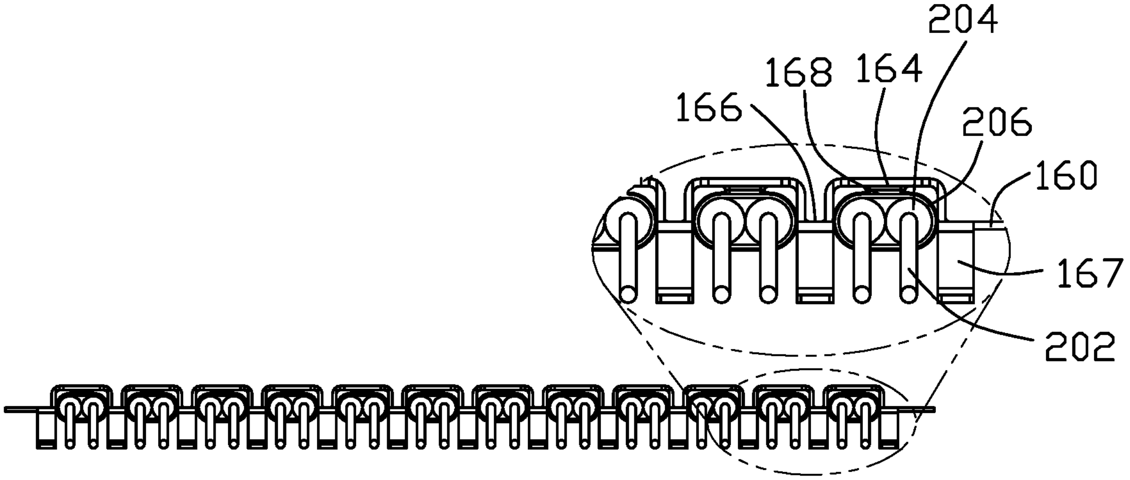
FIG. 10(B) is an elevational view of the combination of the upper grounding bracket and the upper row of wires of the contact module of the contact module assembly of the cable connector of FIG. 10(A)
Figure 11A:
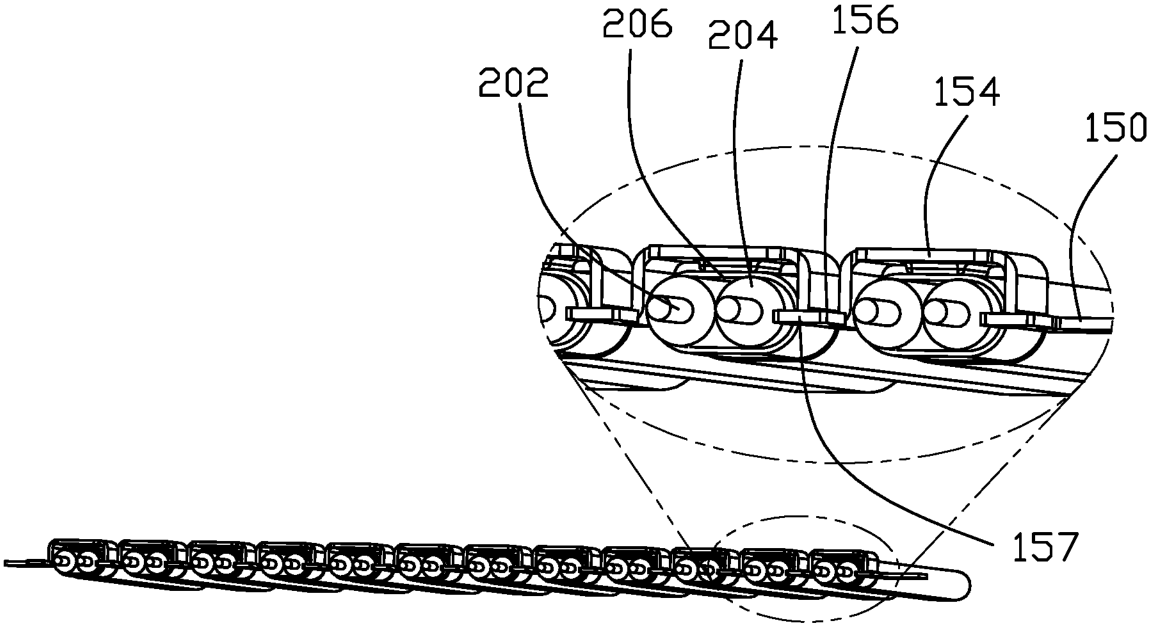
FIG. 11(A) is a perspective view of a combination of the lower grounding bracket and the lower row of wires of the contact module of the contact module assembly of the cable connector of FIG. 8.
Figure 11B:
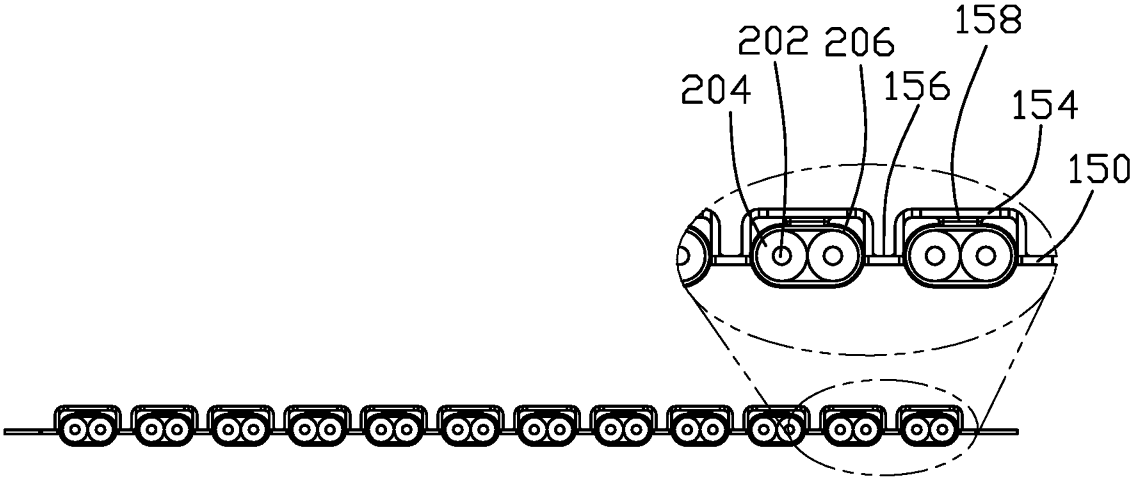
FIG. 11(B) is an elevational view of the combination of the lower grounding bracket and the lower row of wires of the contact module of the contact module assembly of the cable connector of FIG. 11(A)
Figure 12A:
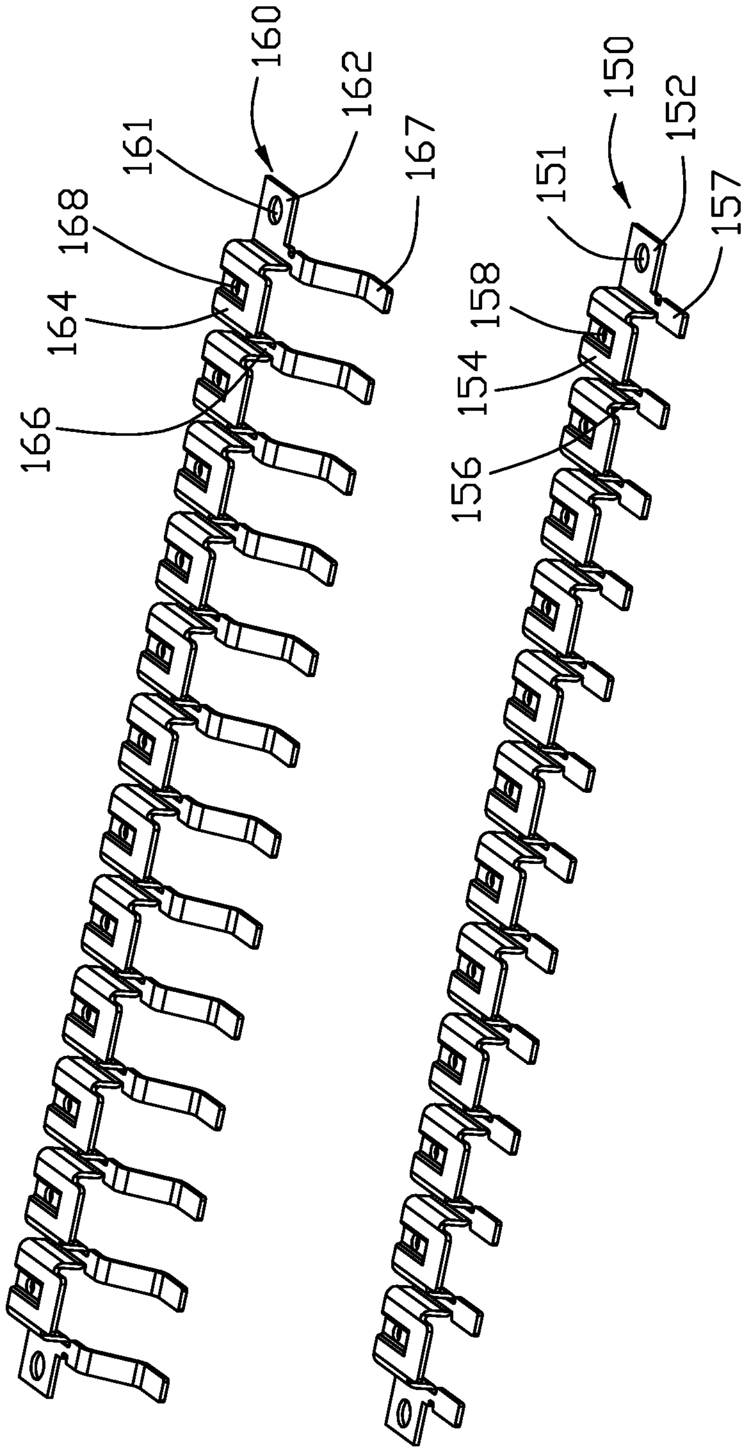
FIG. 12(A) is a perspective view of a combination of the upper grounding bracket and the lower bracket of the contact module of the contact module assembly of the cable connector of FIG. 8.
Figure 12B:
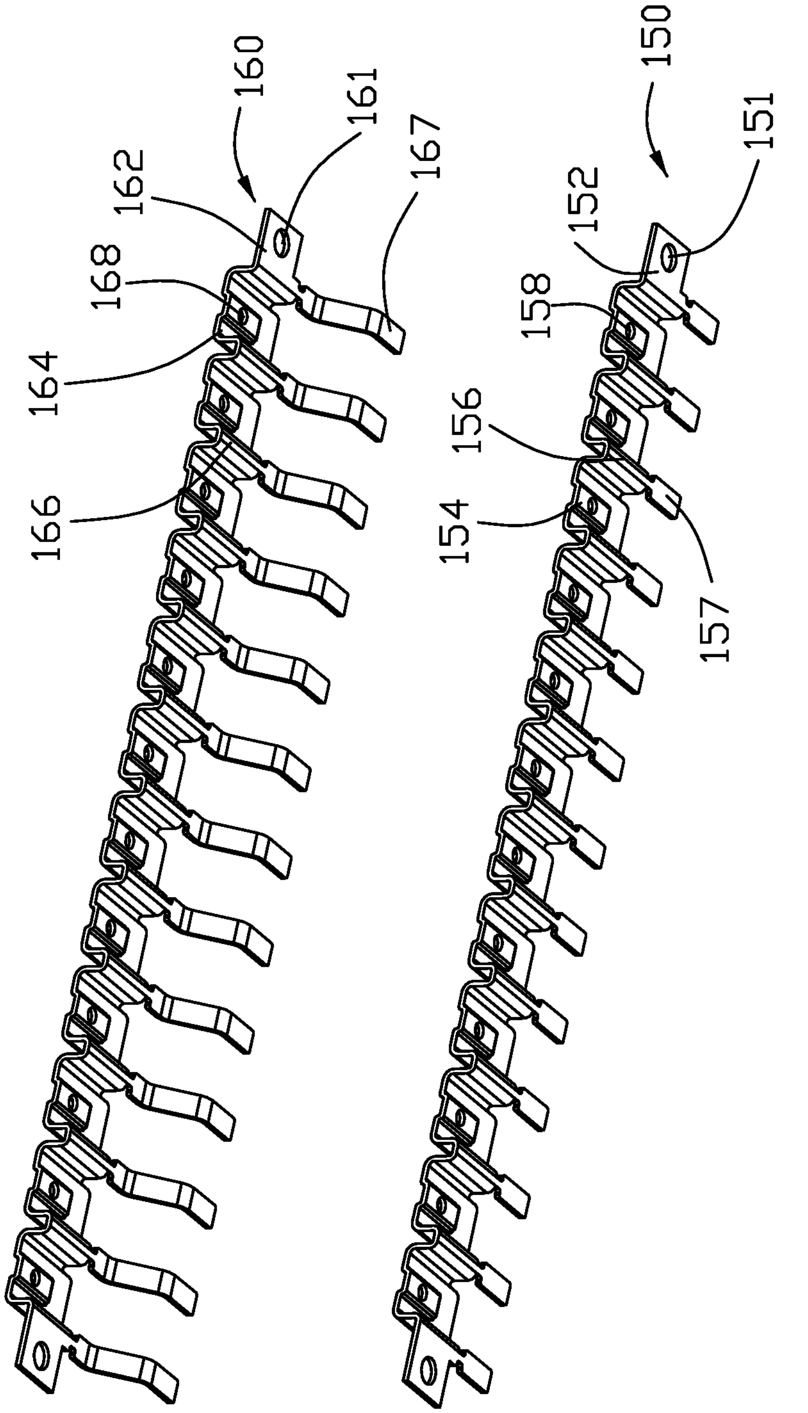
FIG. 12(B) is another perspective view of the combination of the upper grounding bracket and the lower bracket of the contact module of the contact module assembly of the cable connector of FIG. 12(A)
Figure 12C:
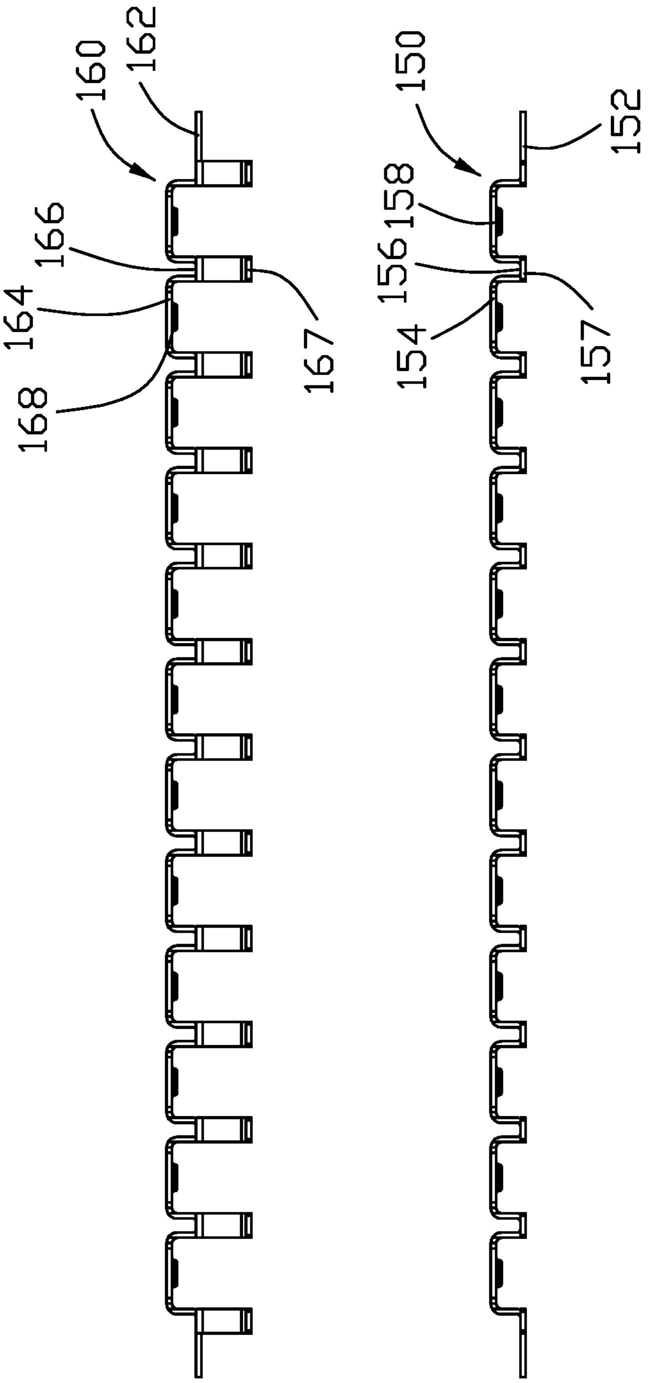
FIG. 12(C) is an elevational view of the combination of the upper grounding bracket and the lower bracket of the contact module of the contact module assembly of the cable connector of FIG. 12(A)
Figure 13A:
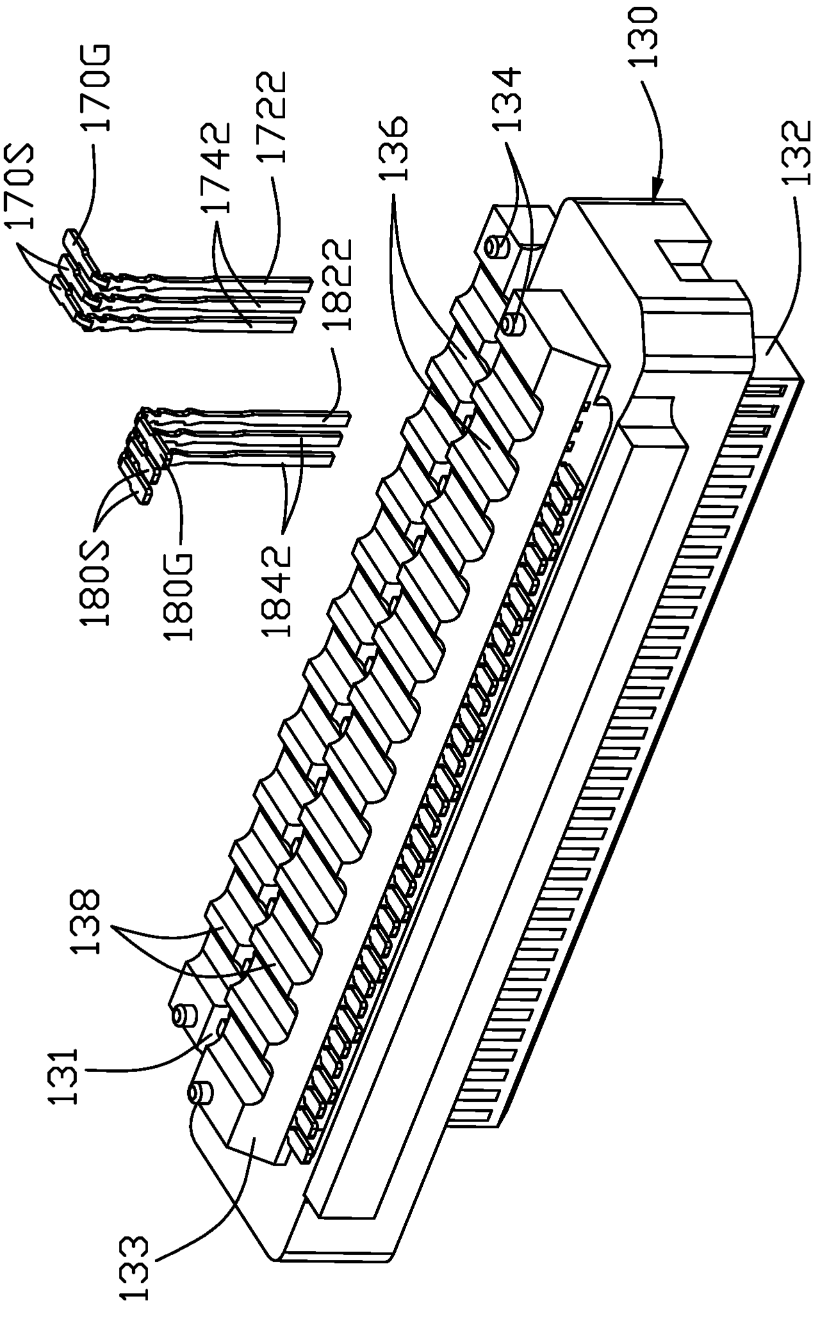
FIG. 13(A) is a perspective view of the contact module of the contact module assembly of the cable connector of FIG. 8 without showing the grounding brackets and the wires.
Figure 13B:
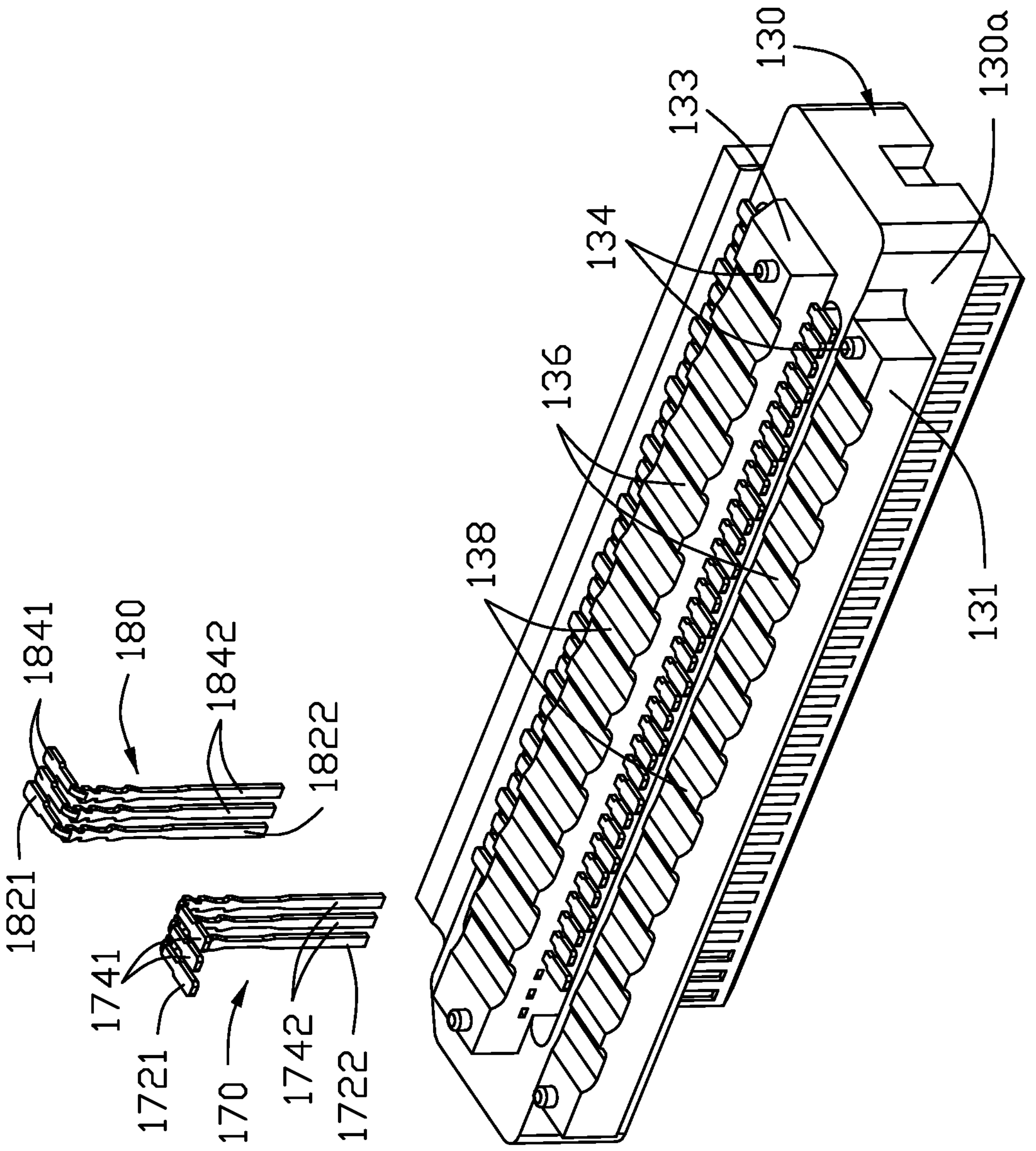
FIG. 13(B) is another perspective view of the contact module of the contact module assembly of the cable connector of FIG. 13(A) without showing the grounding brackets and the wires.

The lower grounding bracket 150 includes a plurality of abutment seats 156 and a plurality of bulged sections 154 alternatively arranged with each other in the longitudinal direction, wherein the abutment seats 156 are seated upon the corresponding ribs 138 while the bulged sections 154 are spaced from the recesses 136 in the vertical direction to respectively retain the corresponding lower row of wires 200*a* (as best shown in FIG. 8) therebetween. The bulged section 154 contacts the braiding layer 206 to establish grounding path therebetween, and is equipped with a hole 158 through which solder material can be applied to reliably mechanically and electrically connect the lower grounding bracket 150 and the corresponding braiding layer 206 together. A plurality of tails 157 respectively extend from the corresponding abutment seats 156 to be electrically and mechanically connect to the connecting sections 1721 of the grounding contacts of the contacts 170 in the inner row. A pair of ears 152 are formed at two opposite ends of the lower grounding bracket 150 with corresponding holes 151 therein tor receive the positioning posts 134 on the lower platform form 131 for retaining the lower grounding bracket 150 upon the lower platform 131. The bulge portion 154 further a downward projection 1581, the hole 158 run through the downward projection 1581 in the upright direction.

Similarly, The upper/second grounding bracket 160 includes a plurality of abutment seats 166 and a plurality of bulged sections 164 alternatively arranged with each other in the longitudinal direction, wherein the abutment seats 166 are seated upon the corresponding ribs 138 while the bulged sections 164 are spaced from the recesses 136 in the vertical direction to respectively retain the corresponding upper row of wires 200*b* (as best shown in FIG. 8) therebetween. The bulged section 164 contacts the braiding layer 206 to establish grounding path therebetween, and is equipped with a hole 168 through which solder material can be applied to reliably mechanically and electrically connect the upper grounding bracket 160 and the corresponding braiding layer 206 together. A plurality of tails 167 respectively extend from the corresponding abutment seats 166 to be electrically and mechanically connect to the connecting sections 1821 of the grounding contacts of the contacts 180 in the outer row. A pair of ears 162 are formed at two opposite ends of the upper grounding bracket 160 with corresponding holes 161 therein tor receive the positioning posts 134 on the upper platform form 133 for retaining the upper grounding bracket 160 upon the upper platform 133. The inner conductors 202*a* of the upper row of wires extend downward and then contact the connecting sections of the differential-pair contacts of the second row of the contacts.

The feature of the invention includes a structure arrangement with the connecting sections 1721/1741 and 1821/1841 of the inner row contacts 170 and the outer row contacts 180 located in the same level while the housing 130 forms a lower platform 131 to cooperate with the lower grounding bracket 150 to mechanically and electrically connect the lower row of horizontal wires 200, and an upper platform 133 to cooperate with the upper grounding bracket 160 to mechanically and electrically connect the upper row of horizontal wires 200, so as to achieve a low profile plug/cable connector efficiently. After mating with the upright receptacle connector, the total height may be only 11.03 mm above the PCB. In addition, as clearly shown in FIG. 6(B), the base 130*a* forms two elongated open slots 137 under the connecting sections 1721/1742 and 1821/1841, respectively, so as to allow a hot bar head to extend therethrough from the bottom side when securing the connecting sections of the contacts with the inner conductors of the corresponding wires and/or the tails of the corresponding grounding brackets.

During manufacturing, the wires are firstly positioned upon the platforms to have the inner conductors positioned upon the connecting sections of the corresponding differential-pair contacts, the grounding bracket is successively positioned upon the platforms and the wires to have the bulged sections hold the exposed braiding layers of the corresponding wires and have the tails positioned upon the connecting sections of the corresponding grounding contacts, and finally securing the connecting sections with the inner conductors of the wires and/or the tails of the grounding bracket via a hot bar head extending upwardly through the open slot from a bottom side. The bulged sections of the grounding bracket are optimally secured to the corresponding braiding layer via solder material injected into the corresponding holes in the bulged sections.

Although the present invention has been described with reference to particular embodiments, it is not to be construed as being limited thereto. Various alterations and modifications can be made to the embodiments without in any way departing from the scope or spirit of the present invention as defined in the appended claims.

What is claimed is:

1. A cable connector comprising:

an insulative housing comprising a base with opposite upper and lower sides in a vertical direction, a mating portion extending downwardly from the lower side, and an upper platform and a lower platform formed around the upper side and each extending along a longitudinal direction which is perpendicular to the vertical direction, the upper platform and the lower platform spaced from each other in both the vertical direction and a transverse direction which is perpendicular to the vertical direction and the longitudinal direction;

first and second rows of contacts disposed in the insulative housing and each row arranged along the longitudinal direction with corresponding contacting sections exposed upon the mating portion and corresponding connecting sections, the connecting sections of the first row being exposed upon the lower platform at a same level in the vertical direction, and the connecting sections of the second row being exposed upon the upper platform at a same level in the vertical direction, each row of contacts comprising a plurality of differential-pair contacts and grounding contacts alternately arranged with each other in the longitudinal direction;

upper and lower rows of wires located above the insulative housing in the vertical direction, each wire comprising an inner conductor, an inner insulator, a metallic braiding layer and an outer insulator sequentially arranged with one another; and a metallic upper grounding bracket and a metallic lower grounding bracket located at different levels in the vertical direction and respectively mounted upon the upper platform and the lower platform, each of the upper grounding bracket and the lower grounding bracket including a plurality of bulged sections and a plurality of tails alternately arranged with each other in the longitudinal direction; wherein the inner conductors of the wires are mechanically and electrically connected to the connecting sections of the differential-pair contacts, the braiding layers of the wires are sandwiched between the bulged sections and the insulative housing in the vertical direction, and the tails are mechanically and electrically connected to the connecting sections of the grounding contacts.

2. The cable connector as claimed in claim 1, wherein each bulged section forms a hole through which solder material is applied to mechanically and electrically connect the grounding bracket with the braiding layer.

3. The cable connector as claimed in claim 1, wherein the wires extend in the transverse direction, the upper row of wires connect to the second row of contacts which is located opposite to an extension direction of the wires in the transverse direction while the lower row of wires connect to the first row of contacts which is one a same side of the extension direction of the wires.

4. The cable connector as claimed in claim 1, wherein the connecting sections of the second row of contacts and the connecting section of the first row of contacts are located by two opposite sides of the upper platform in the transverse direction, the connecting sections of the first row of contacts are located between the upper platform and the lower platform in the transverse direction.

5. The cable connector as claimed in claim 1, wherein the connecting sections of the first row and the second row of contacts are located at a same level in the vertical direction.

6. The cable connector as claimed in claim 1, wherein each platform forms a plurality of ribs and a plurality of recesses alternately arranged with each other in the longitudinal direction, and each grounding bracket includes a plurality of abutment seats in alignment with the tails in the transverse direction and alternately arranged with the corresponding bulged sections in the longitudinal direction so as to have the abutment seats seated upon the corresponding ribs, and the bulged section spaced from while aligned with the corresponding recesses in the vertical direction to receive the corresponding wires therein.

7. The cable connector as claimed in claim 6, wherein the tails of the lower grounding bracket are coplanar with the abutment seats while the tails of the upper grounding bracket are downwardly offset from the corresponding abutment seats in the vertical direction.

8. The cable connector as claimed in claim 1, further comprising a metallic shell upwardly assembled to the housing to protectively surround the mating tongue.

9. The cable connector as claimed in claim 8, further comprising a case enclosing an upper case and a lower case assembled together to receive the insulative housing therein, wherein the lower case forms an opening through which the metallic shell extends downwardly.

10. The cable connector as claimed in claimed 1, wherein the base forms two elongated open slots under the connecting sections of the contacts in the vertical direction for allowing a hot bar head to upwardly extend therethrough when securing the connecting sections with either the inner conductors of the wires or the tails of the grounding bracket.

11. A cable connector comprising:

an insulative housing defining opposite upward and downward sides in a vertical direction;

a mating portion downwardly extending from the downward side of the insulative housing;

a first platform and a second platform formed on the upward sides and spaced from each other in a transverse direction perpendicular to the vertical direction, the second platform being leveled higher than the first platform in the vertical direction and;

first and second rows of contacts disposed in the insulative housing and each row arranged along the longitudinal direction with corresponding contacting sections exposed upon the mating portion and corresponding connecting sections, the connecting sections of the first row and the second row extending in opposite directions in the transverse direction, each row of contacts comprising a plurality of differential-pair contacts and grounding contacts alternately arranged with each other in the longitudinal direction;

first and second rows of wires located upon the upward sides, extending along the transverse direction, and soldered with the connecting sections of differential-pair contacts of the first and second rows of contacts respectively; and a first grounding bracket and a second grounding bracket assembled upon the first platform and the second platform respectively, each grounding bracket forming a plurality of bulged sections and a plurality of tails alternately arranged with each other in a longitudinal direction perpendicular to both the vertical direction and the transverse direction;

wherein in the vertical direction, the first row of wires are sandwiched between the bulged sections of the first grounding bracket and the first platform, and the second row of wires are sandwiched between the bulged sections of the second grounding bracket and the second platform.

12. The cable connector as claimed in claim 11, wherein the tails of the grounding brackets are soldered with corresponding connecting sections of the grounding contacts respectively.

13. The cable connector as claimed in claim 11, wherein each platform forms a plurality of recesses in alignment with the corresponding bulges sections in the vertical direction to cooperate with the corresponding bulged sections to receive the corresponding wires.

14. The cable connector as claimed in claim 11, wherein each wire includes an inner conductor, an inner insulator, a metallic braiding layer and an outer insulator sequentially arranged with one another, and the bulged section is mechanically and electrically connected to the braiding layer.

15. The cable connector as claimed in claim 14, wherein each bulged section further forms a hole into which solder material is applied to secure the bulged section and the braiding layer together.

16. The cable connector as claimed in claim 15, wherein the tails of the first grounding bracket are located by two sides of the inner conductors of the first row of wires in the longitudinal direction.

17. The cable connector as claimed in claim 11, wherein each bulged section forms a downward trough from a top of the bulge section on which the hole defined, the downward trough portion press downward against the braiding layer.

18. A cable connector comprising:

an insulative housing comprising a base with opposite upper and lower sides in a vertical direction, a mating portion extending downwardly from the lower side, and an upper platform and a lower platform formed around the upper side and each extending along a longitudinal direction which is perpendicular to the vertical direction, the upper platform and the lower platform spaced from each other in both the vertical direction and a transverse direction which is perpendicular to the vertical direction and the longitudinal direction; and first and second rows of contacts disposed in the insulative housing and each row arranged along the longitudinal direction with corresponding contacting sections exposed upon the mating portion and corresponding connecting sections;

wherein the connecting sections of the first row of contacts extend toward the lower platform and are located between the lower platform and the upper platform in the transverse direction, the connecting sections of the second row of contacts extend away from the upper platform in the transverse direction, and the connecting sections of the first row and the second row of contacts are located at same level in the vertical direction.

* * * * *